Sept. 1, 1942.  F. R. ZIMMERMAN  2,294,707
DRUM FEED SPRING ASSEMBLING MACHINE
Filed July 31, 1940  16 Sheets-Sheet 4

Inventor:
Fred R. Zimmerman,
By: Rudolph Wm. Lotz
Attorney.

Witness:
E. Camporini

Sept. 1, 1942.  F. R. ZIMMERMAN  2,294,707
DRUM FEED SPRING ASSEMBLING MACHINE
Filed July 31, 1940  16 Sheets-Sheet 8

Witness:
E. Camporini

Inventor:
Fred R. Zimmerman,
By: Rudolph  
Attorney.

Sept. 1, 1942.   F. R. ZIMMERMAN   2,294,707
DRUM FEED SPRING ASSEMBLING MACHINE
Filed July 31, 1940   16 Sheets-Sheet 9
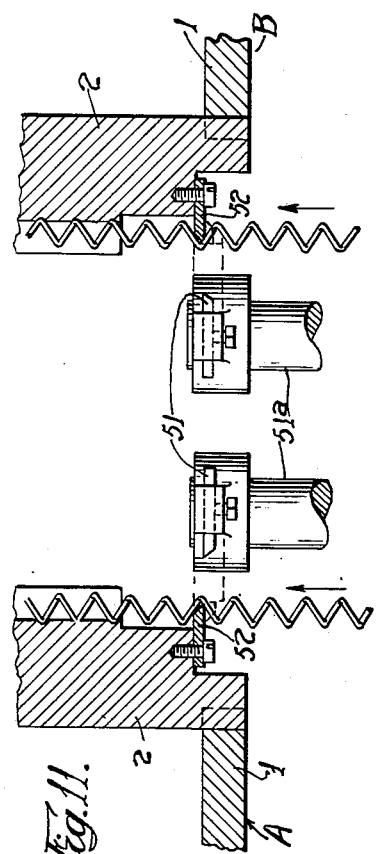
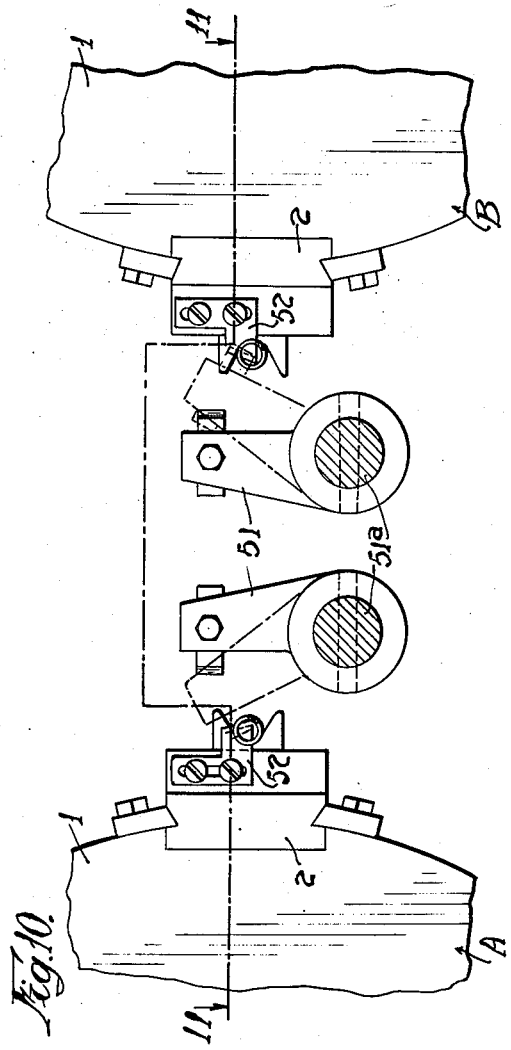
Inventor:
Fred R. Zimmerman,
By: Rudolph Wm. Lotz
Attorney.
Witness:
E. Camporini

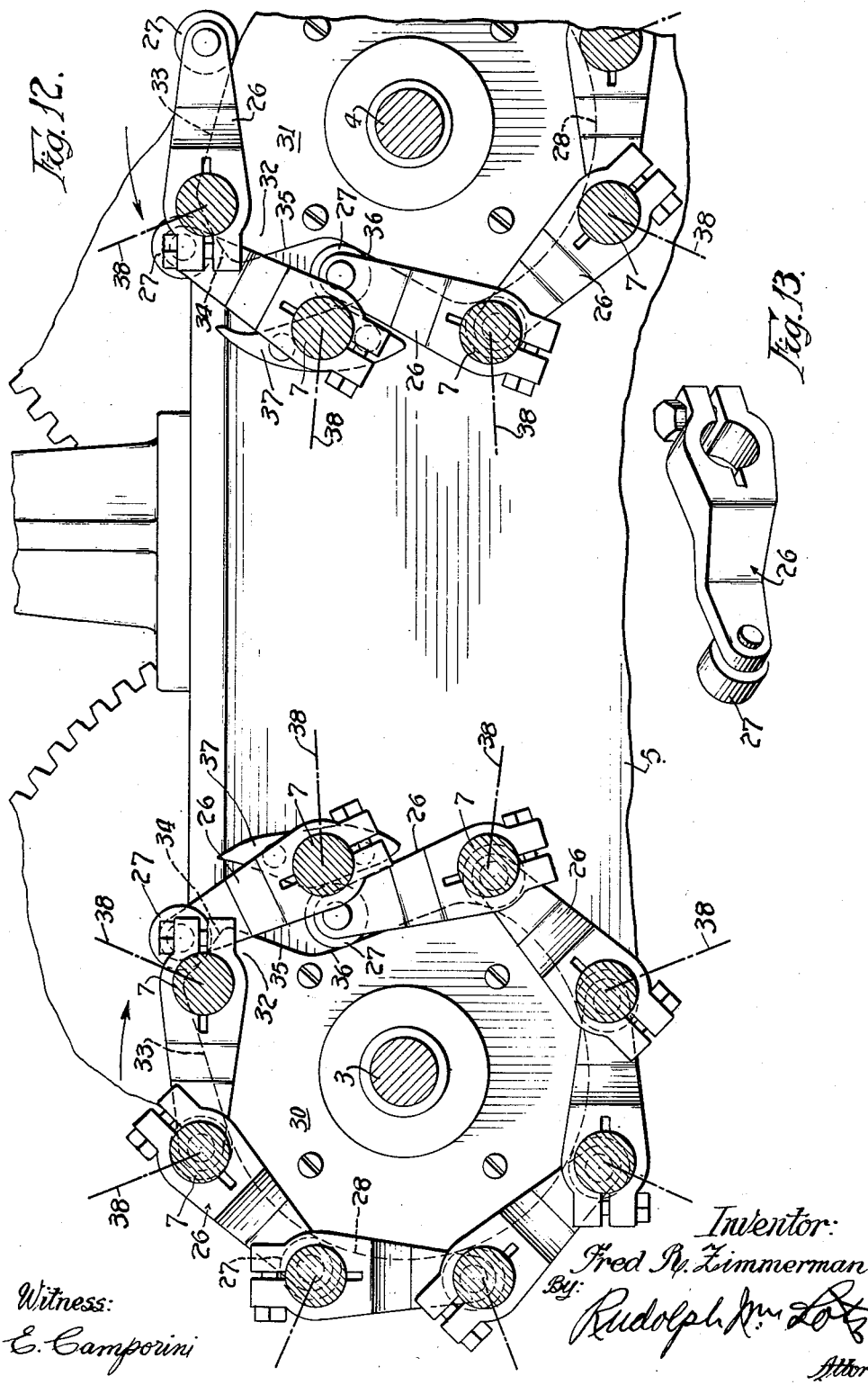

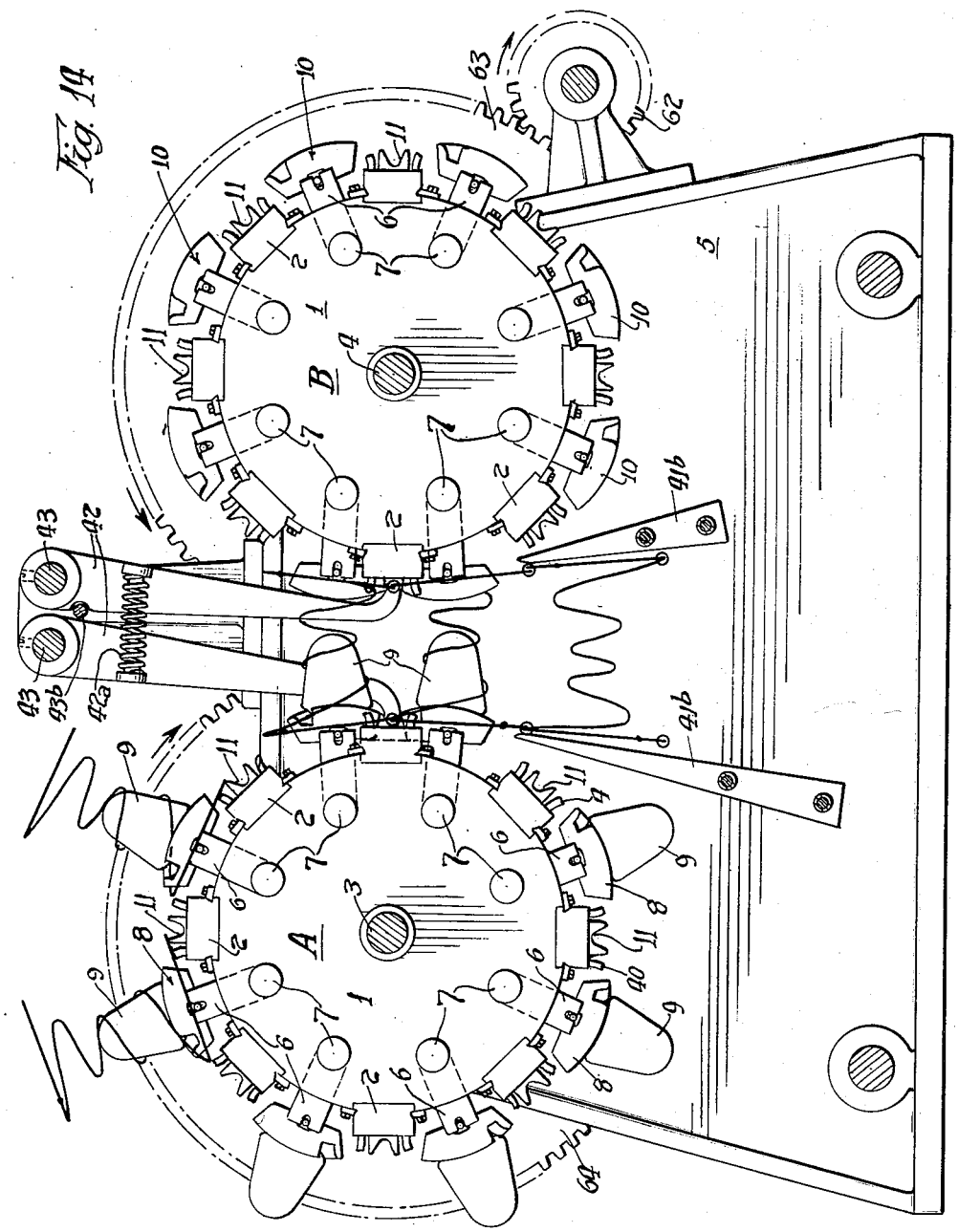

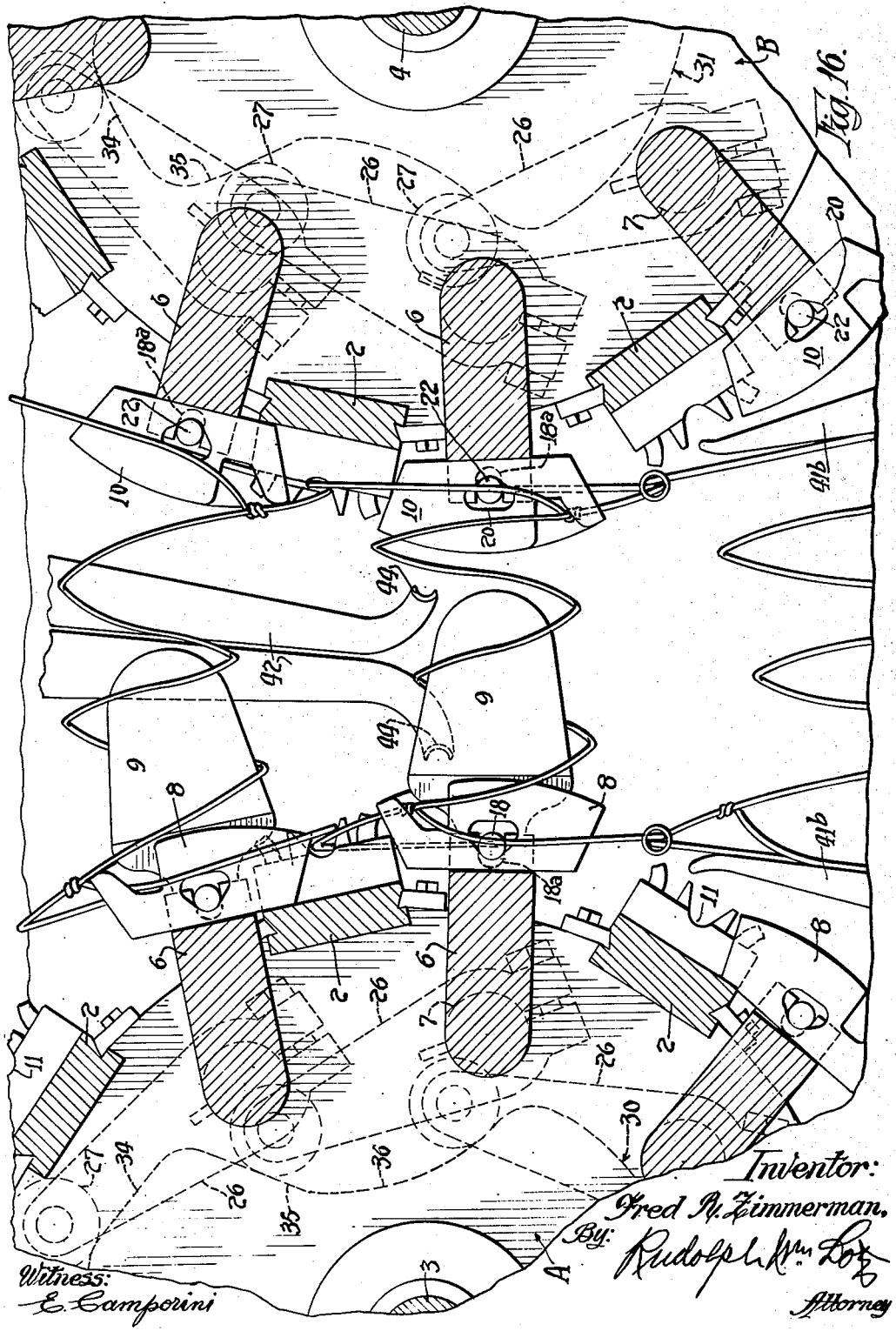

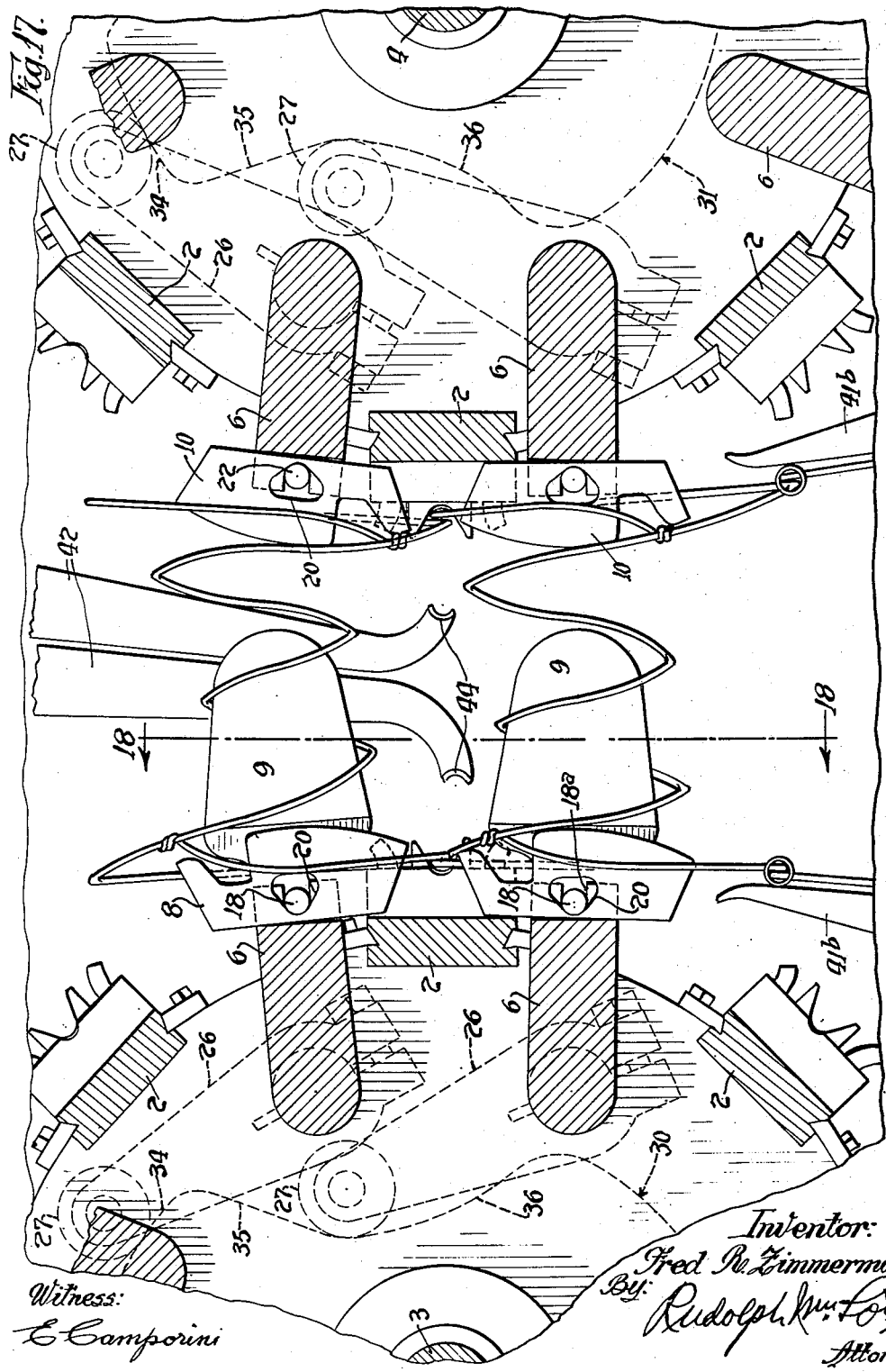

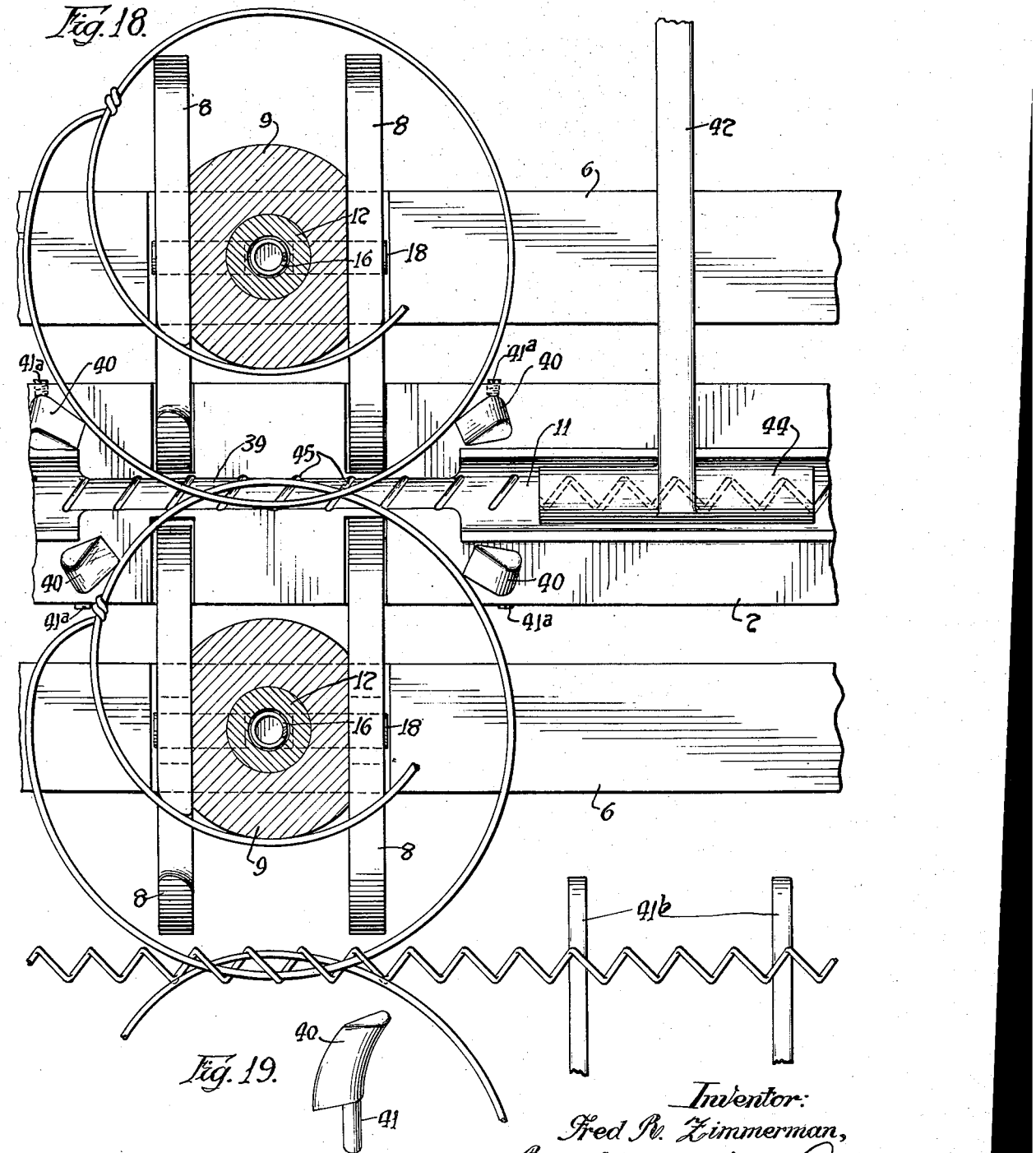

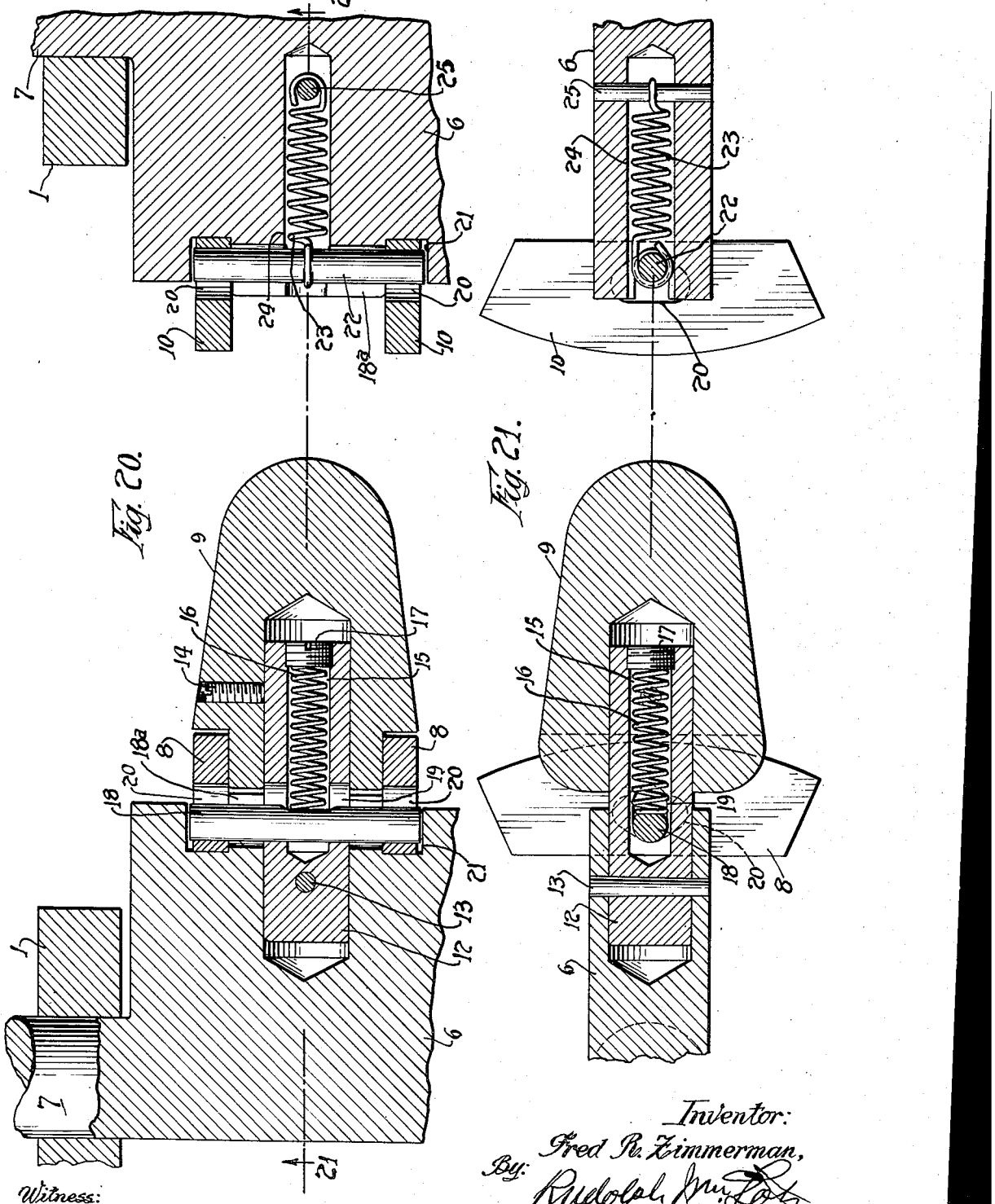

Patented Sept. 1, 1942

2,294,707

UNITED STATES PATENT OFFICE 2,294,707

DRUM FEED SPRING ASSEMBLING MACHINE

Fred R. Zimmerman, Chicago, Ill., assignor to Nachman Spring-Filled Corporation, Chicago, Ill., a corporation of Illinois Application July 31, 1940, Serial No. 348,788

36 Claims. (Cl. 140—3)

This invention relates to improvements in machines for assembling upholstery springs by means of helical tie-wires and has for its general object to provide an efficient machine for that purpose which can be operated rapidly.

A particular object of the machine is to provide a carrier for the successive rows of springs to be assembled which can be loaded by an operator while two preceding rows of springs are being coupled as they attain another position in the machine, each new row of springs being connected with the next preceding row thereof until the number of rows of springs requisite to make up the desired length of the ultimate structure have been connected successively by means of helical tie wires.

A further object of the invention is to provide means whereby the two rows of springs to be connected by means of a tie-wire are brought automatically into proper relative positions in alignment with tie-wire feeding means to cause the tie-wire to encircle overlapped portions of the terminal coils of the springs at both ends of the latter.

A further object of the invention is to provide a machine for the purpose specified into which the upholstery springs are fed by hand and the operations of which are manually controlled but power actuated.

Another essential object of the invention is to provide rotary means for carrying successive rows of springs into substantially the relative positions wherein they may be joined by the tie-wires and wherein additional means are provided to bring said rows of springs into the exact relative positions to be joined.

Another object of the invention is to provide mechanisms for forming and feeding the helical tie-wires into encircling relation to overlapped spring portions together with automatic controls for said mechanisms and automatic means for cutting off the tie-wire at substantially the instant that said mechanisms stop operations.

Other objects of the invention will be readily understood from or particularly pointed out in the following specification.

A suitable embodiment of the machine is illustrated in the accompanying drawings, wherein—

Fig. 10 is an enlarged fragmentary detail sectional view taken on the line 10—10 of Fig. 2.

Fig. 11 is a fragmentary detail plan sectional view taken on the line 11—11 of Fig. 10.

Fig. 12 is a vertical transverse sectional view taken on the line 12—12 of Fig. 2.

Fig. 13 is a detail perspective view of an actuating arm.

Fig. 14 is a vertical transverse sectional view taken on the line 14—14 of Fig. 2.

Fig. 16 is a view similar to Fig. 15, on a larger scale, showing operating parts of the latter in another position.

Fig. 17 is a view similar to Figs. 15 and 16 showing the same parts in still another position.

Fig. 18 is a fragmentary detail sectional view taken on the line 18—18 of Fig. 17.

Fig. 19 is a detail perspective view of a spring locating device.

Fig. 20 is a fragmentary detail plan sectional view taken on the line 20—20 of Fig. 15.

Fig. 21 is a fragmentary detail sectional view taken on the line 21—21 of Fig. 20.

Figure 2:
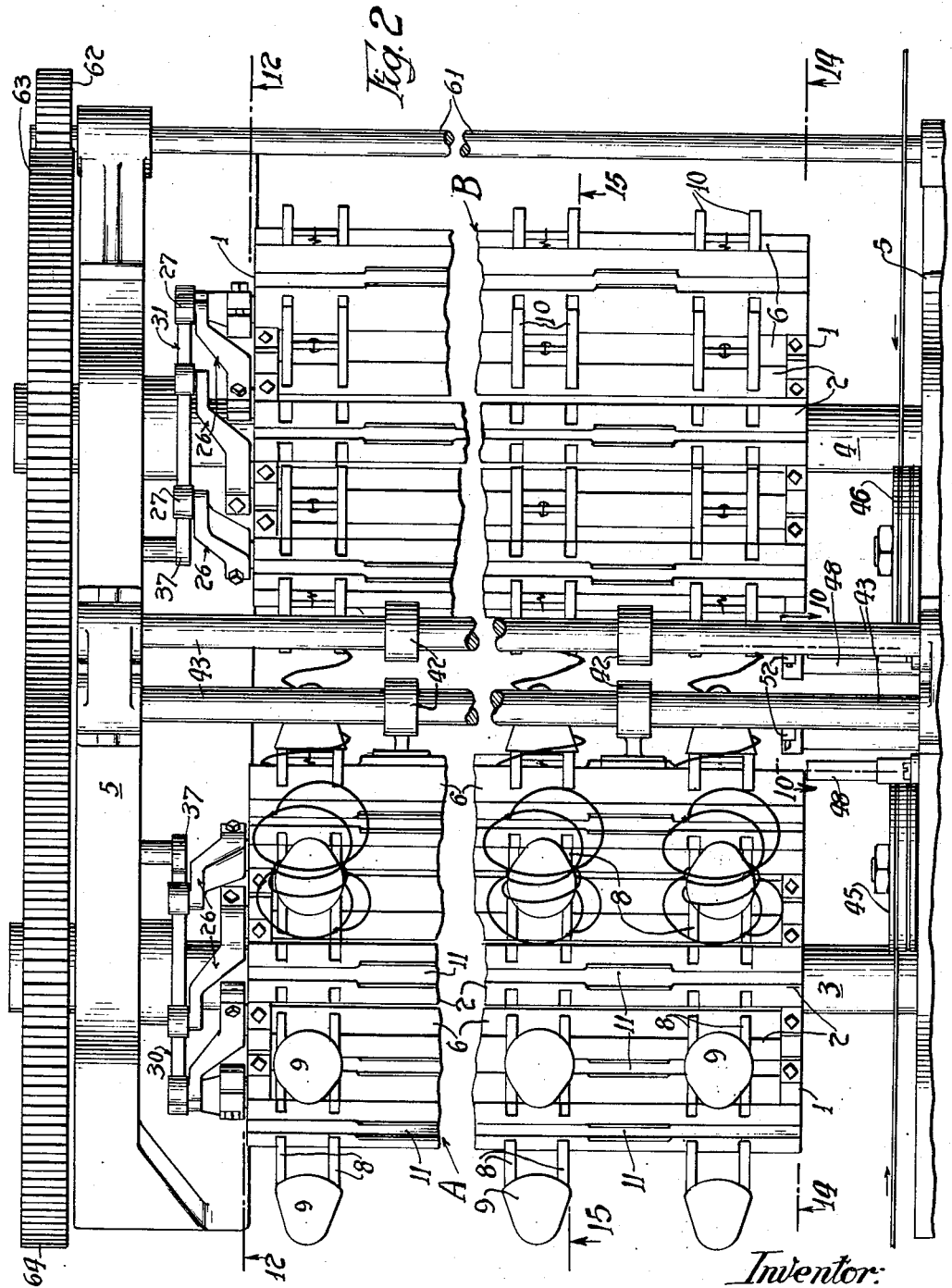
Fig. 2 is a plan view of the left-hand side portion of the machine, parts thereof being broken away.

As shown in Figs. 2 and 14, the machine includes two parallel spaced apart rotatable drums each of which comprises a pair of end plates 1 and cross-bars 2, the latter being equally spaced apart. Said end plates are mounted rigidly upon the respective shafts 3 and 4 journalled at their ends in bearings carried by side frame members 5, one of which is shown in Fig. 2.

A series of flat rocking bars 6 are equipped with trunnions journalled in bearings in the end plates 1 and are disposed in staggered relation to the bars 2, parallel with the latter.

The end plates 1 and cross-bars 2 constitute drums which, for convenience, will be referred to hereinafter as drums A and B, respectively.

The bars 6 of the drum A are equipped at intervals with spring carriers 8. Each of the bars 6 of the drum A, carries a substantially truncated cone shaped pin 9 which is adapted to project into an upholstery spring of the hour-glass type as shown in Fig. 14.

The devices 10 of the bars 6 of drum B are devoid of the pins 9 and are more properly designated as presser members 10 which cooperate with the carriers 8 of drum A to effect compression of the springs carried by the latter as the same attain a certain point in their travel, as hereinafter more fully described.

Each of the cross-bars 2 is equipped with channeled guides 11 for a helical tie-wire to be disposed into encircling relation to overlapped portions of the upholstery springs as particularly described hereinafter.

As shown in detail in Figs. 20 and 21 and in Fig. 2, each of the pins 9 is of substantially but distorted truncated cone shape and is equipped with a shank 12 which is disposed telescopically in an opening in a bar 6 and is secured therein by means of a cross-pin 13, said shank being also telescopically engaged in an opening in the pin 9 and held rigid therewith by means of a set-screw 14. Each pin 9 is substantially elliptical at its base and becomes circular at its upper end portion in cross section as shown in Fig. 2. The portion of the shank 12 engaged in the pin 9 is equipped with an axial pocket 15 in which a compression spring 16 is housed and disposed between the cap 17 of said pocket and a cross-pin 18 which projects through longitudinal slots 19 in the wall of the pocket at a point below the base of the pin 9. Said pins 18 lie at their end portions in recesses 18a (see Figs. 15, 16 and 17).

The carrier 8 comprises a pair of parallel plates each equipped midway between its ends with a substantially triangular slot 20 in which an end portion of the cross-pin 18 engages, the latter being normally maintained in firm contact with the apex portions of the openings 20 by the spring 16 and thereby the corner plates 8 are maintained engaged with the bottom walls of recesses 21 in the bar 6. The pin 9 is recessed at diametrically opposed points to receive the outer middle portions of the carrier plates 8 which are equipped with arcuate spring-engaging surfaces. Said carrier plate is confined against lateral movement between the side walls of the recesses of the pin 9 and the side walls of the recess 21 which extend transversely of the bar 6. The top wall of each recess of the pin 9 is straight and is spaced from the arcuate surface of a carrier-plate 8 so that the latter is rendered capable of movement relatively to the bar 6 upon terminal points of the recess 21 as fulcrums and against the action of the spring 16, the purpose of the latter being to hold the carrier 8 firmly engaged with the bar 6 against rocking movement on said fulcrums.

The bars 6 of the drum B are also equipped with said recesses 21, the plate members 10 being identical with the carrier plates 8 in shape and size and with respect to being equipped with the triangular openings 20 in which cross-pins 22 engage, the latter acting like the cross-pins 18 under the influence of tension springs 23 disposed in sockets 24 of the bars 6 and which are anchored at their inner ends upon pins 25.

While the rocking bars 6 are carried by the drums A and B, they are actuated to move to different positions during rotation of said drums by means of stationary cams 30 and 31 rigid with one of the side-frame members 5. The drum A rotates clockwise and the drum B anti-clockwise as shown in Fig. 12 wherein the cams 30 and 31 are clearly illustrated.

Each of the trunnions 7 is equipped with an adjustable crank arm 26 which carries an anti-friction roller 27 at its outer end. Each of said rollers rides upon the surface of one of said cams 30 and 31 which are partially circular as shown at 28 throughout more than half its circumference. Each cam has a projection 32 equipped with a surface 33 tangential to its circumference and joins a short substantially flat surface 34 which is almost perpendicular to a radius of the shaft 3, and a substantially vertical but slightly inclined surface 35 which joins a surface 36 to form a very shallow recess. Opposed to said recess is a rigid cam member 37 which cooperates with said recess to form a guide for the anti-friction rollers of the several crank-arms 26 to prevent said arms from moving by gravity out of their predetermined paths of travel.

The dot and dash lines 38 indicate the positions of the several rocking bars 6 in their respective positions when the crank arms 26 are disposed in the positions determined by points of contact of their respective anti-friction rollers with the surfaces of the cam 30. One of the crank-arms 26 is shown in detail in Fig. 13.

The cam 31 is identical with the cam 30 but is reversed in position.

When the crank arms 26 farthest to the right of the axis of shaft 3, and the crank-arms 26 farthest to the left of the axis of shaft 4 attain the positions shown in Fig. 12, then the pairs of bars 6 controlled by said crank-arms and cams 30 and 31 will be almost parallel with each other and the arms 6 of the left-hand pair will be directly opposed to those of the right-hand pair. By reference to Fig. 18 it will be noted that when said left-hand pair of bars 6 is in the position of Fig. 12, the springs carried by the pins 9 of said bars are disposed in overlapped relation to each other over the guide channel 39 for the helical tie wire, said channels 39 being extensions of the wider guide channels 11 mentioned above.

The springs carried by the pins 9 are of greater length than the distance between the faces of the spring-carrier bars 8 of drum A and bars 10 of drum B so that when the latter and bars 8 are disposed in the position indicated by the dot and dash lines 38 of Fig. 12 last described, said springs will be slightly compressed. The positions of said springs at this time is shown clearly in Fig. 15 at the instant of completion of the operation of tying them together by means of helical tie-wires advanced through the guide channels 11 and 39 of the cross-bars 2 of the respective drums A and B.

Figure 15:
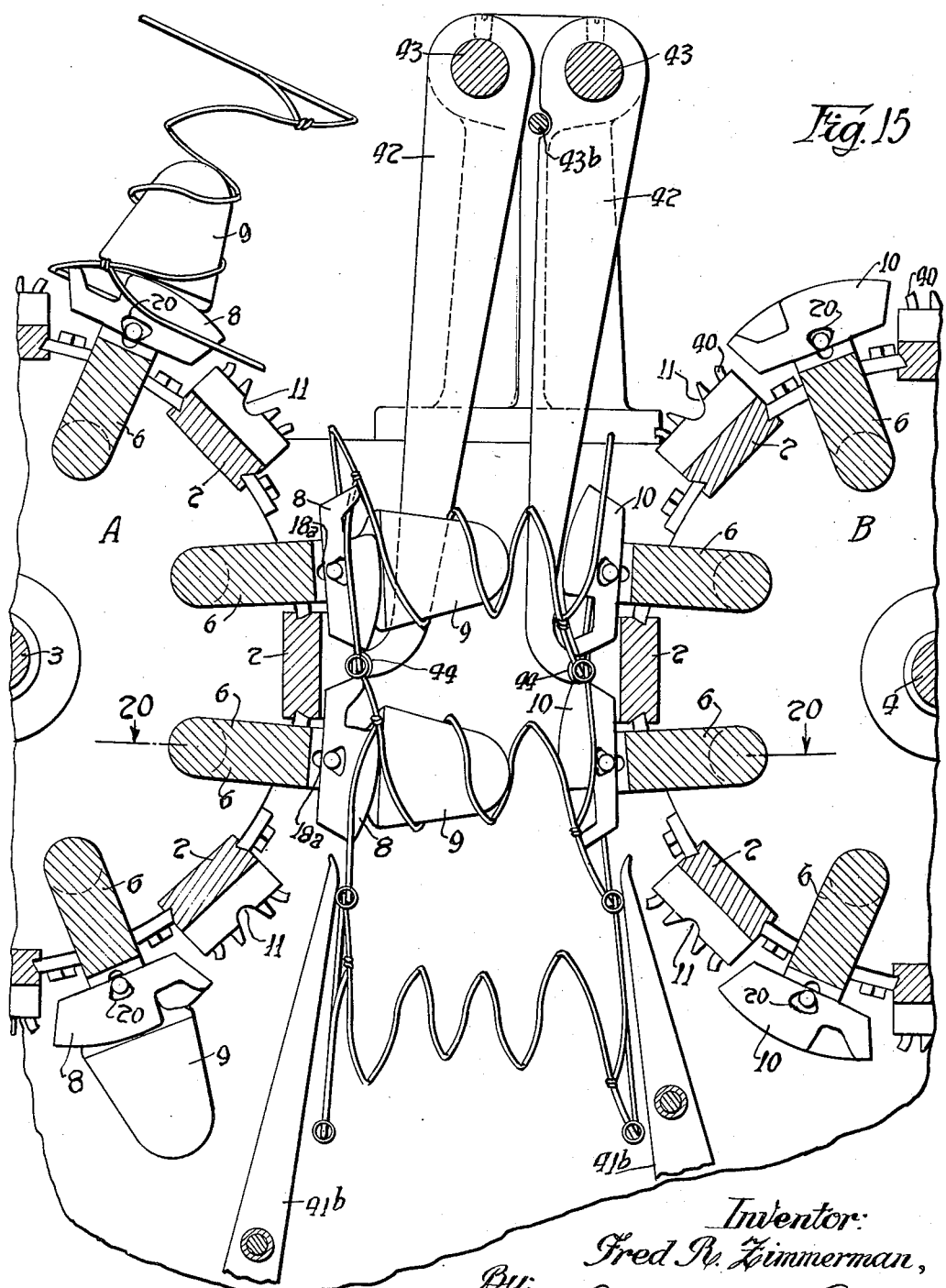
Fig. 15 is an enlarged detail fragmentary transverse sectional view taken on the line 15—15 of Fig. 2 with certain parts shown in elevation.

As the last-named respective pairs of bars 6 and the members 8 and 10 mounted thereon approach the positions illustrated in Figs. 15, 16 and 17, the terminal coils of the pairs of springs mounted upon the rows of said pins 9 associated with the members 8, are brought into engagement with pairs of stops 40 (see Fig. 18), one of which is shown in detail in Fig. 19. Said stops 40 are equipped with shanks 41 which project through openings in the bars 2 and are held firmly in position by set screws 41a in a conventional manner. Said stops 40 are adjustable about the axes of the shanks 41 and, as shown, are somewhat arcuate longitudinally and substantially triangular in cross-section.

Said stops cooperate with the pins 9 to bring the terminal coils of the springs of the rows of springs to be encircled and coupled by the tie-wires, into the overlapped position over the guide channels 39 as shown in Fig. 18.

After the two rows of springs are disposed in the position of Fig. 14, they are joined by means of tie-wires at both ends and the tying of the same is followed by movement of the members 6 of each of the drums A and B that carry the members 8, 9 and 10, to the positions shown at the lower ends of Figs. 17 and 18 by cooperation of the crank-arms 26 of said members 6 with the cams 30 and 31, respectively, and during this arcuate movement of the drums A and B, combined with the swing of the last-named arms 6 relatively thereto, the pins 9 are withdrawn from the lower set of springs.

During the downward movement of the lower row of springs last referred to the same pass between pairs of opposed guide bars 41b which are convergent toward each other upwardly and have curved divergent upper ends.

As shown in Fig. 16 the bars 8 associated with the pins 9 carrying the last-named row of springs are so positioned at substantially the instant of release of the pins 9 from said springs that they become slightly tilted by engagement with bar 2 just above the same.

To facilitate withdrawal of the pins 9 from the springs as last described one of the plates 8 and 10 respectively, of each pair thereof is provided with a recess 8a and 10a respectively, shown in dotted lines in Figs. 20 and 21, and in full lines in Fig. 14 which permits the springs to tip slightly with respect to the pins 9 as the lower parts of their terminal coils become engaged with the left-hand guide bar of Fig. 14.

The movements of the drums A and B are intermittent and each such movement comprises one-seventh of a revolution simultaneously of both drums, the mechanism for effecting such movements being described hereinafter.

Pairs of suspended arms 42 are mounted upon parallel row shafts 43 (Fig. 4) and are equipped at their lower ends with channeled guide shoes 44 which cooperate with the guide channels 11 to receive and guide the helical tie wires, in conjunction with the guide grooves 11 and the channels 39, into encircling relation to the overlapped spring portions. Pairs of said arms 42 arranged to be opposed to the channels 11 are disposed in staggered relation to the pins 9 and members 10 of the respective drums A and B and are swung automatically to the position shown in Figs. 14, 15 and 18 and from said positions shown in Figs. 16 and 17, their movement to the position of Figs. 14, 15 and 18, preceding the feeding of the tie-wire into encircling relation to the overlapped spring portions. Their return movement to the position of Figs. 16 and 17 precedes the next arcuate movement of the drums A and B.

The helical tie-wires are formed and fed into the guide channels 39 and 11 by means of a conventional type of mechanism siuted to the purpose which, as shown in Figs. 8, 9, 10 and 11 includes two pairs of wire feed rolls 45 and 46 respectively which are rotatably mounted upon the machine frame beyond one end of each of the drums. These feed rolls push the wire through bending cams 47 and thence through openings in tubular members 48 projecting toward the drums. In each tube 48 there is mounted a cylindrical bar 49 equipped with a helical groove 50 to snugly fit the wire and which forms the same to a helical contour of predetermined pitch. Said bar is held against all movement by means of the set-screw 49a.

The axis of each bar 49 is aligned with the axis of a guide channel 11 during each interval of rest of the drums and by means of mechanism hereinafter described, the feed rolls 45 and 46 are actuated immediately following the movement of the levers or arms 42 to the position of Fig. 15 and such actuation is stopped as soon as the tie-wire has attained the predetermined length required to encircle overlapped portions of springs of two rows thereof. Thereupon the operation of the rolls 45 and 46 stops the tie-wire being then cut off adjacent the end of the tube 48 by means shown in Figs. 10 and 11 and thereupon the levers or arms 42 move back to the position of Fig. 17 and then the drums rotate through the aforesaid arc.

Figure 7:
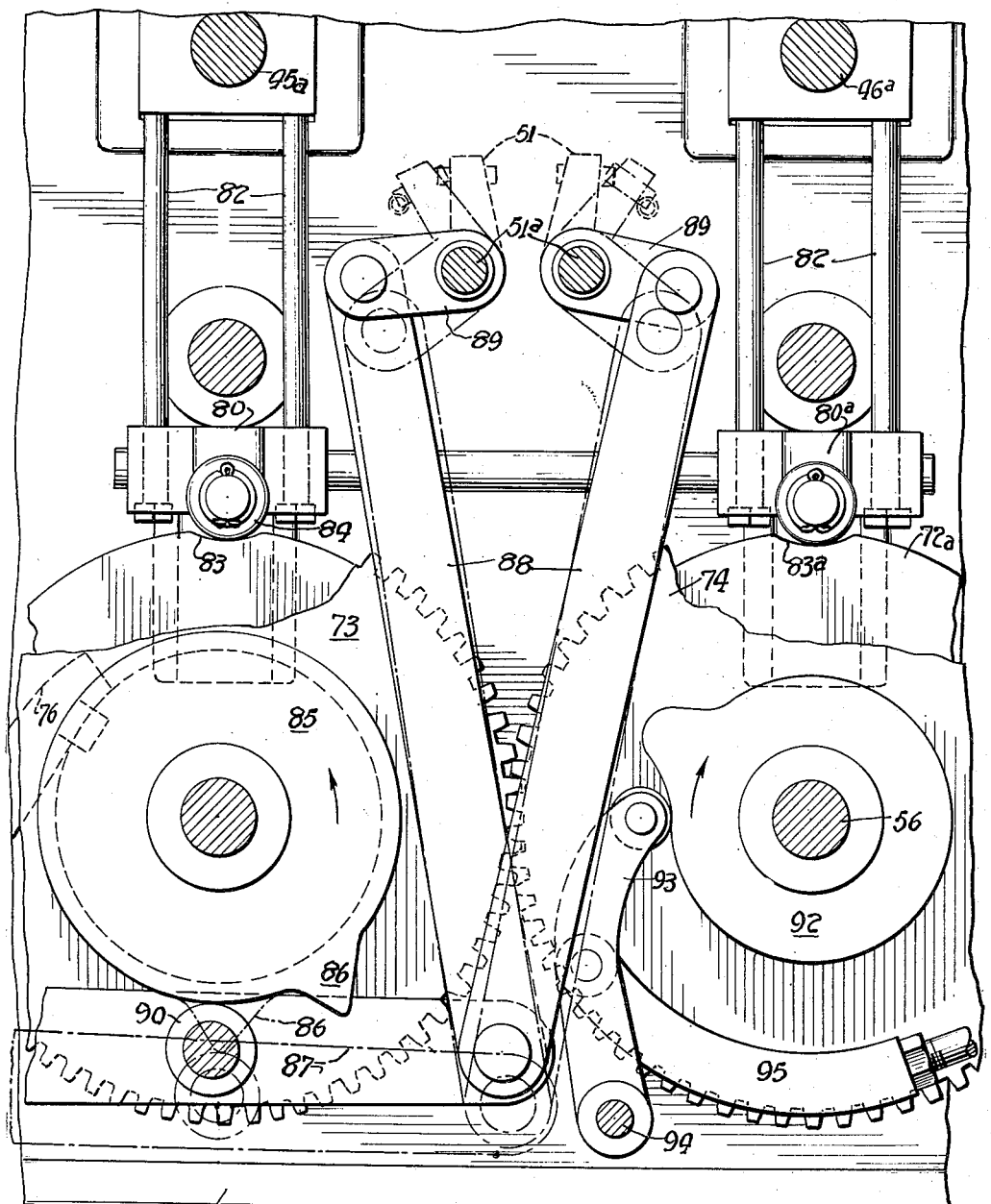
Fig. 7 is a fragmentary transverse sectional view taken on the line 7—7 of Fig. 1 on same scale as Figs. 5 and 6.
Figure 8:
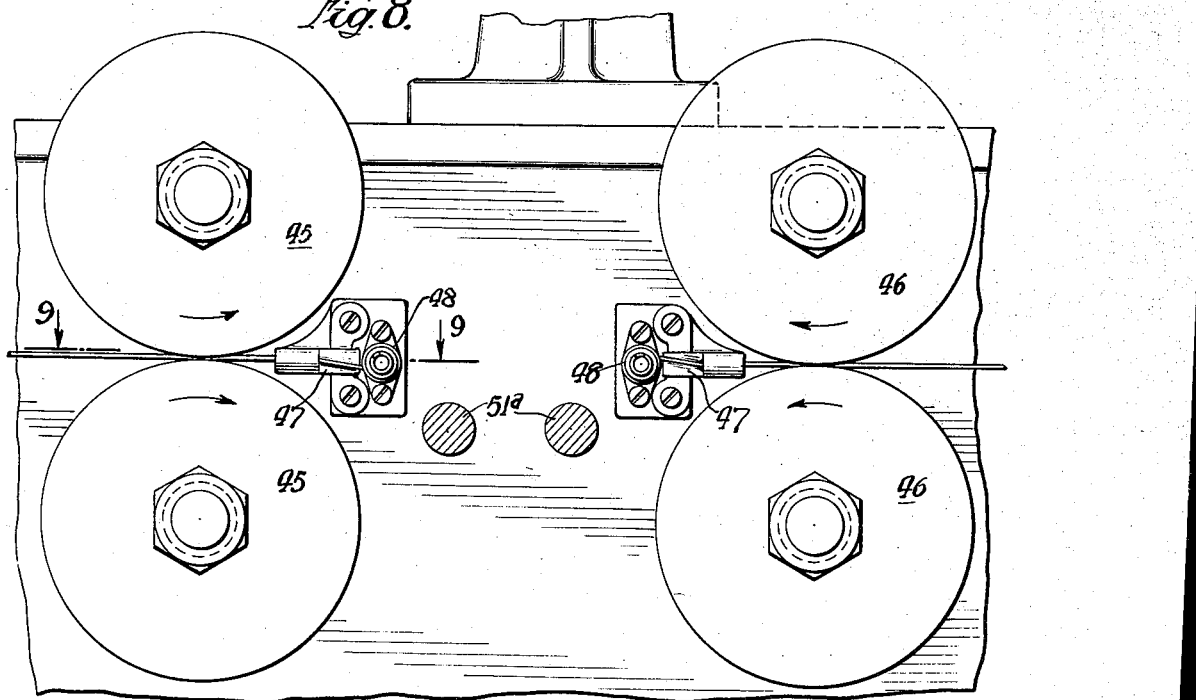
Fig. 8 is a fragmentary detail sectional view taken on the line 8—8 of Fig. 1 on substantially the enlarged scale of Figs. 5 and 6.

The tie-wire cut-off devices 51 and mechanism for actuating the same is shown in detail in Figs. 7 and 10. Each of said cut-off devices acts as a shear member cooperating with a shear plate 52 rigid with a cross-bar 2 of the respective drums A and B, as best shown in Fig. 11, the tubes 48 being also shown in Fig. 2 as extending almost to the shear plates 52.

Figure 3:
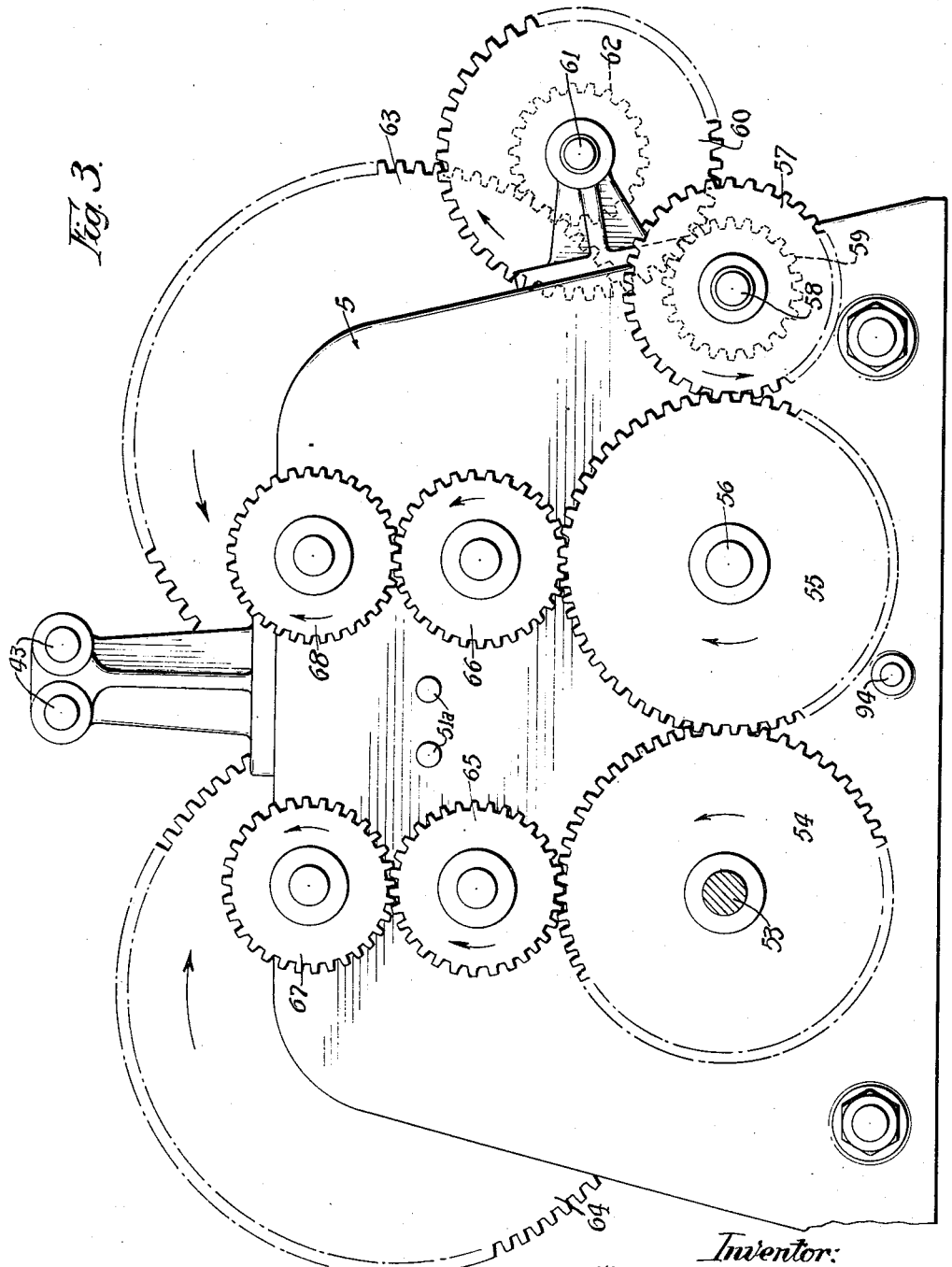
Fig. 3 is a right-hand side elevation of the machine viewed from the line 3—3 of Fig. 1.

The gearing for actuating the drums A and B is best shown in Fig. 3 wherein the shaft 53 is the drive shaft carrying a spur-gear wheel 54 which meshes with the spur-gear wheel 55 on a countershaft 56. The gear-wheel 55 meshes with the gear wheel 57 on the countershaft 58 which carries the spur-gear pinion 59 meshing with a spur-gear wheel 60 on a countershaft 61. The latter carries a spur-gear pinion 62 which meshes with the spur-gear wheel 63 which actuates the drum A and which meshes with the spur-gear wheel 64 which drives the drum B.

The spur-gear wheels 54 and 55 also mesh with idle spur-gear wheels 65 and 66 which mesh with spur-gear wheels 67 and 68 whose functions are described hereinafter.

Figure 5:
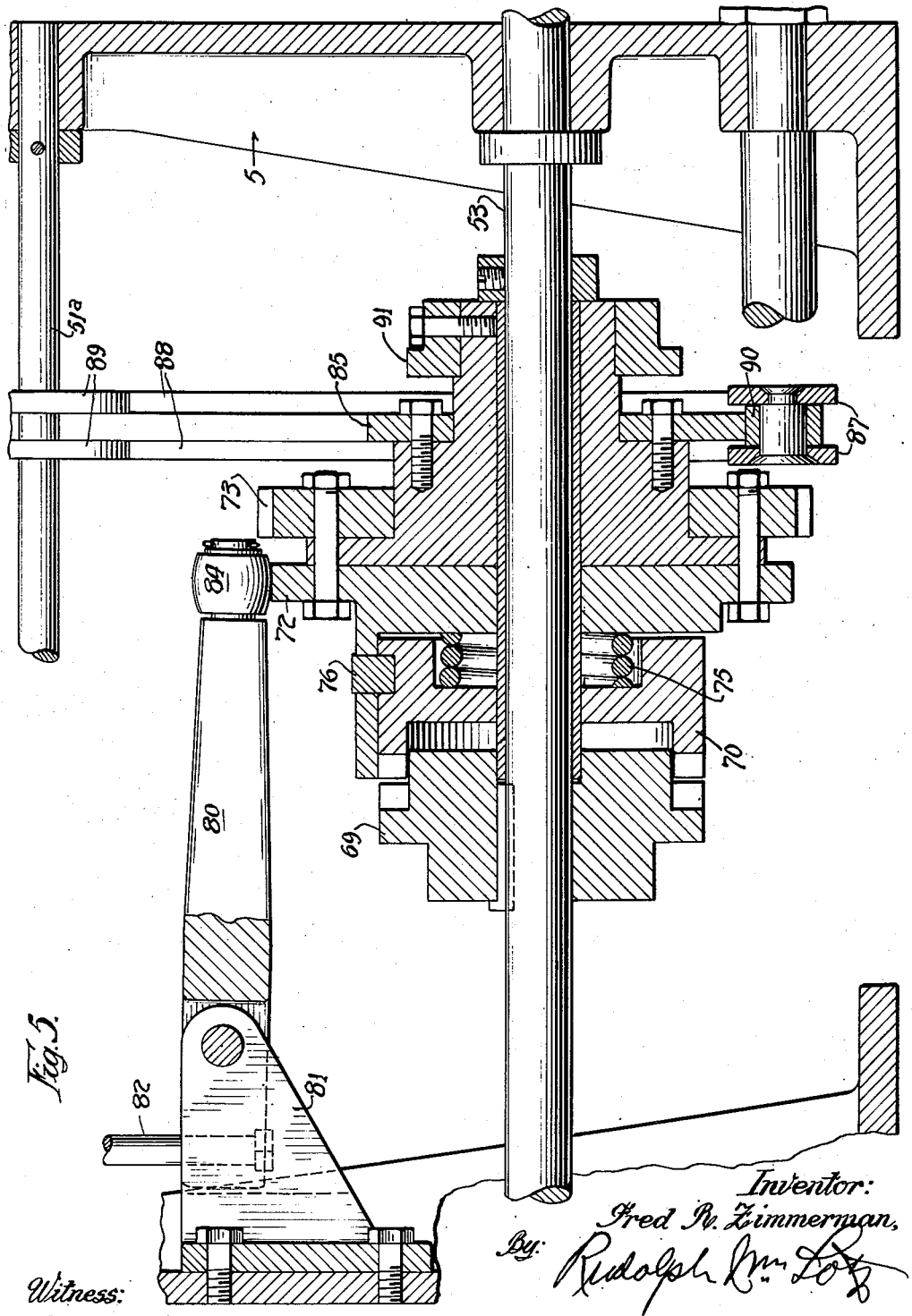
Fig. 5 is a fragmentary vertical longitudinal sectional view on an enlarged scale, taken on the line 5—5 of Fig. 4.
Figure 6:
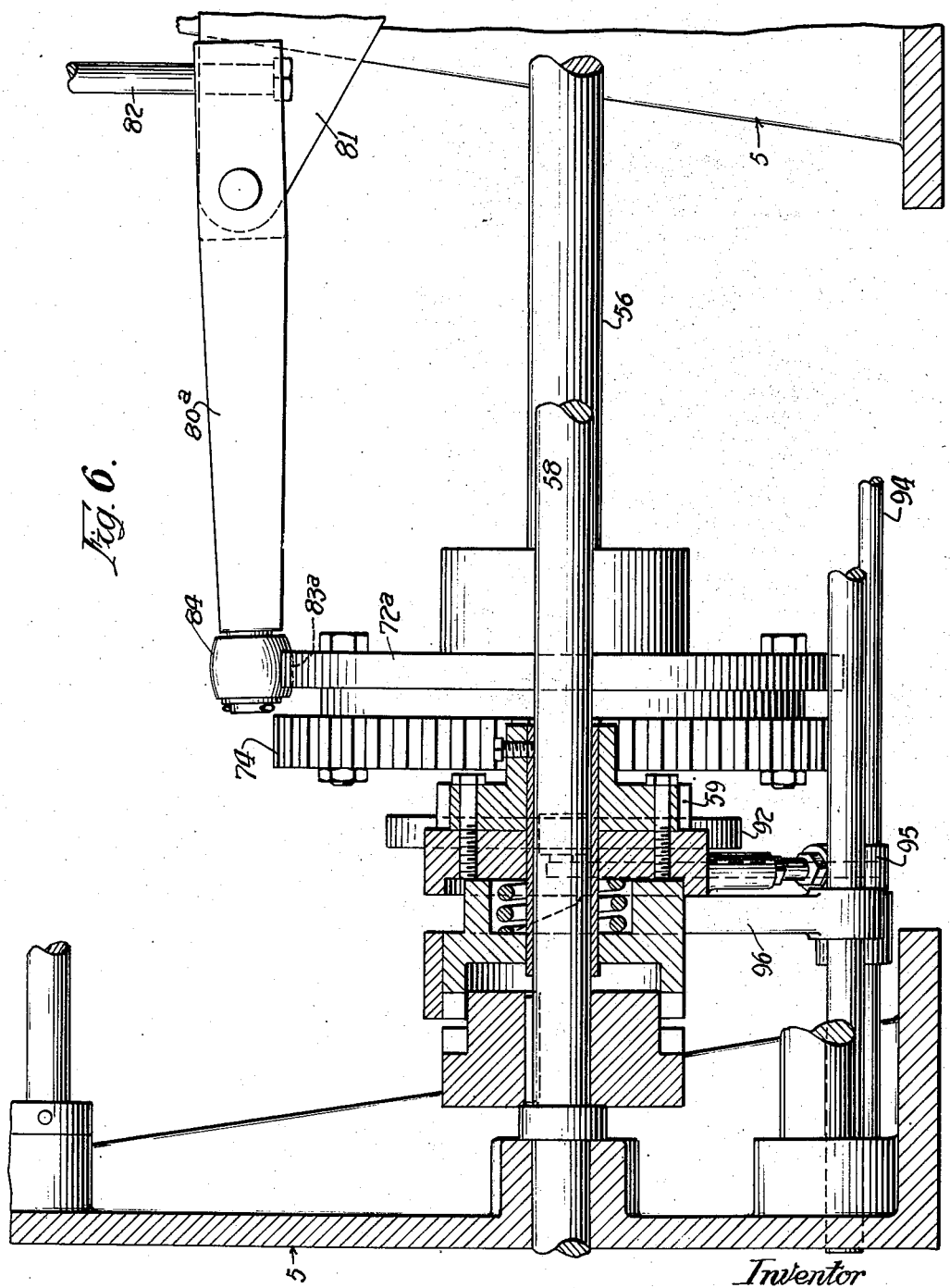
Fig. 6 is a view similar to Fig. 5 taken on the line 6—6 of Fig. 4.

The spur-gear wheel 54 is rigidly mounted upon the shaft 53 which is rigid with the toothed clutch member 69 (Figs. 1 and 5) and cooperates with a companion clutch member 70 loosely mounted on said shaft 53.

The drive shaft 53 is suitably geared to a source of power for continuous rotation at low speed.

Figure 4:
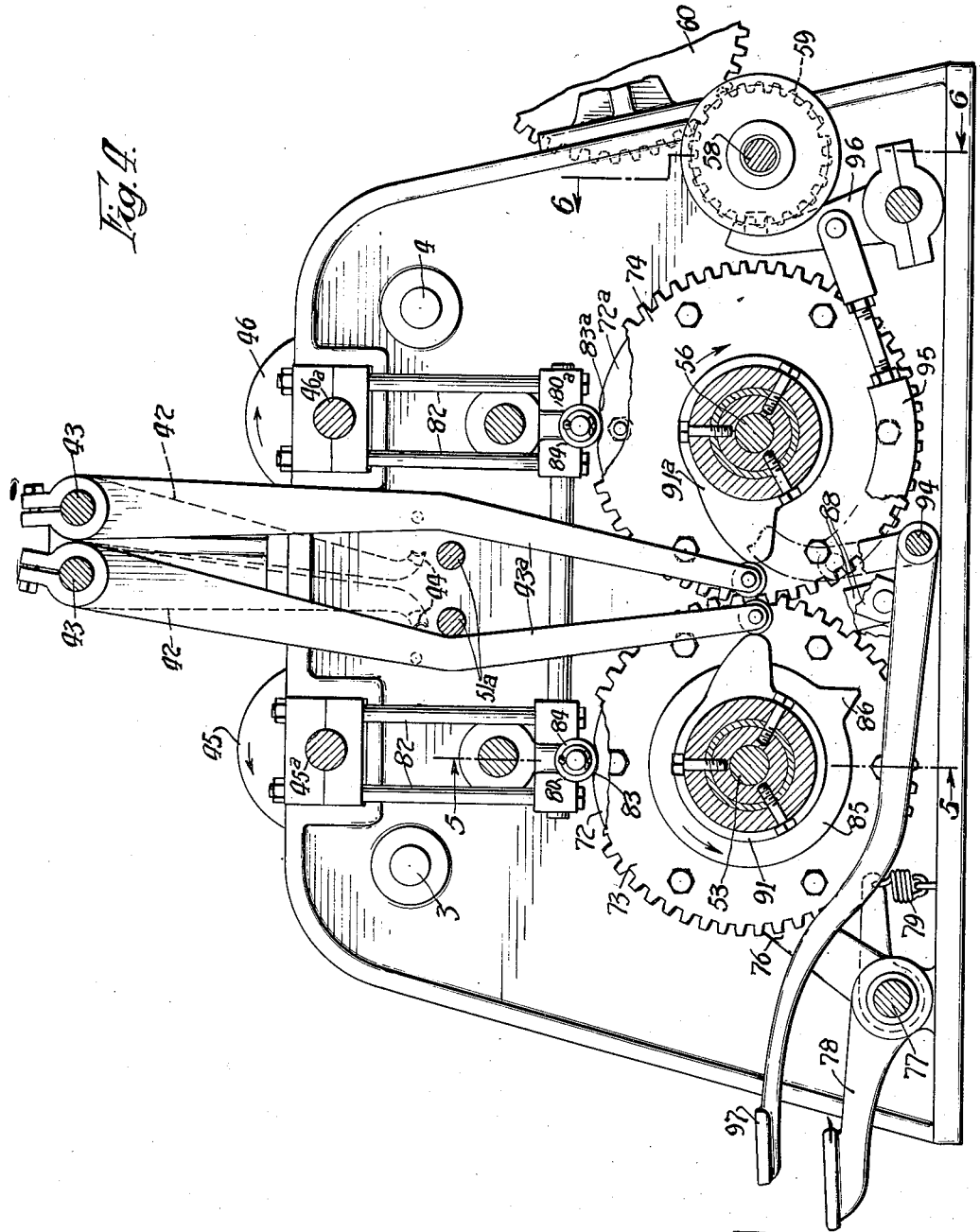
Fig. 4 is a vertical longitudinal sectional view taken on the line 4—4 of Fig. 1.

The clutch-member 70 is slidable relatively to the member 69 and the cam 72. The latter is rigid with the spur-gear wheel 73 which meshes with a spur-gear wheel 74 on the counter-shaft 56 (Fig. 4).

Figure 1:
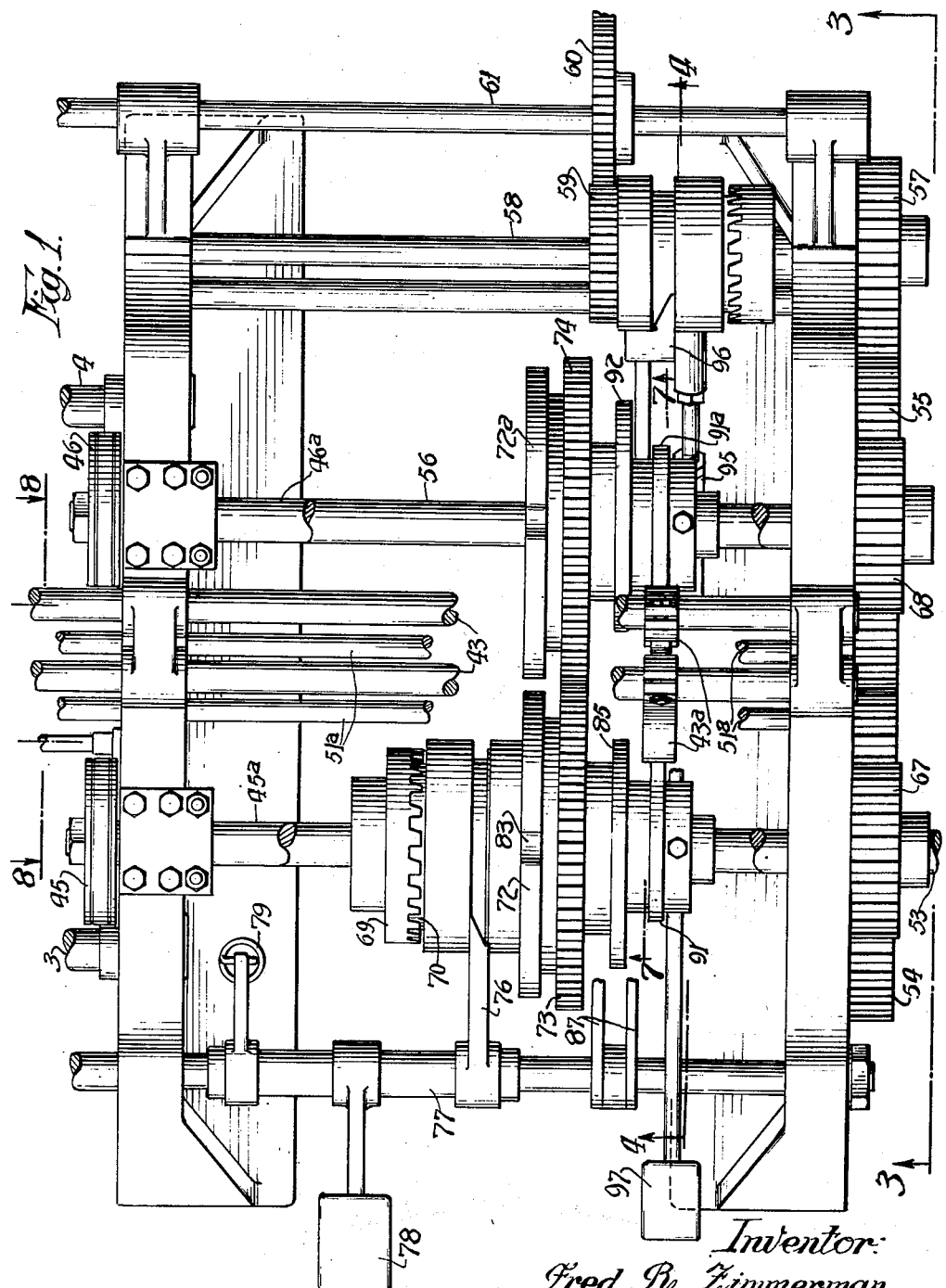
Fig. 1 is a plan view of the right-hand side portion of the machine, parts thereof being broken away.

The clutch-member 70 is moved into engagement with the clutch member 69 by means of the spring 75 (Fig. 5) upon swinging the release lever 76 of the rock-shaft 77 upwardly, the said lever 76 being equipped with a cam end 78 which serves to throw the clutch-member 70 back to normal position when said lever 76 is restored to its normal position of Fig. 1 by releasing the foot lever 78 of rock-shaft 77 and causing return of the latter to its normal position responsively to the action of the tension spring 79. The structure described in this paragraph is mainly that pertinent to a conventional punch-press clutch.

Figure 9:
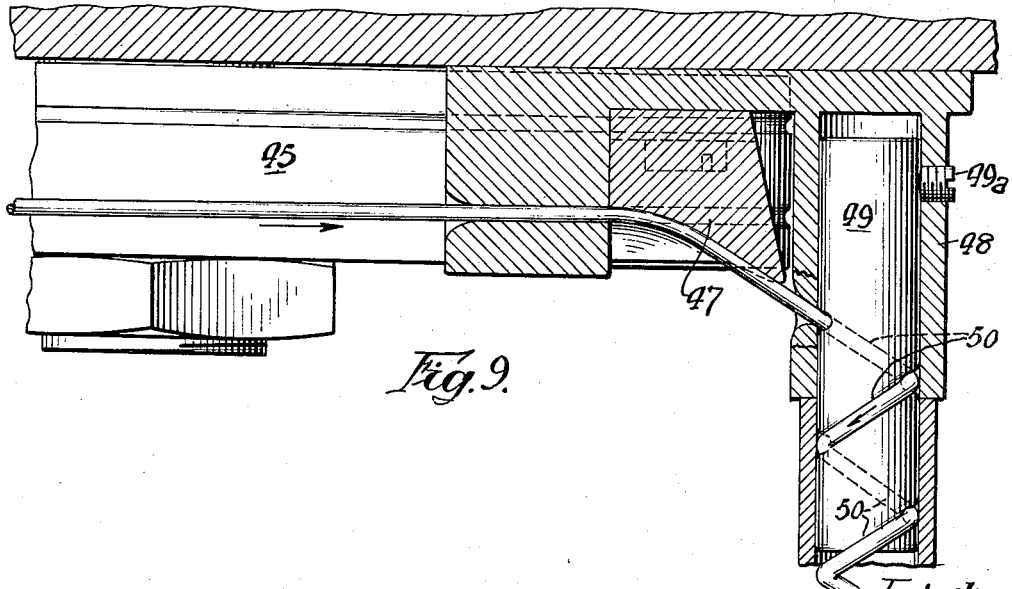
Fig. 9 is a plan sectional view on an enlarged scale taken on the line 9—9 of Fig. 8.

The cam 72 (Fig. 5) actuates the rocking lever 80 which is pivotally mounted between its ends on a bracket 81 of the frame and is equipped at its other end with arms 82 operatively associated with the bearing of the shaft 45a of the upper feed-roll 45 to throw the same into engagement with the helical tie wire to effect feeding of the latter through the forming mechanism shown in Fig. 9, said cam 72 being provided with a peripheral recess 83 (Fig. 4) in which the roller 84 of the lever 80 lies during intervals of non-rotation of the cam 72. A similar cam 72a is mounted on the countershaft 56. (Fig. 7.)

Also rigid with the cam 72 and spur-gear wheel 73 is a cam 85 equipped with a projection 86 which actuate the lever 87 (Fig. 7) connected with a pair of links 88. The latter are connected with crank arms 89 of parallel rock-shafts 51a which carry the cut-off members 51. Said lever 87 is equipped between its ends with an anti-friction roller 90 normally disposed in the path of the projection 86, the latter being shown in its idle position between intervals of rotation of the cam 85.

Rigid with the cams 72 and 85 is a cam 91 (Fig. 4) which cooperates with the cam 91a to actuate the levers 43a rigid with rock-shafts 43 to throw the levers 42 into the position of Fig. 4 during intervals of non-rotation of the several cams last-above described. Stops 43b are associated with the levers 42 for obvious reasons, the said levers 42 and 43a being held normally at the outer limits of their relative movement by a suitable spring or springs 42a, Fig. 14.

Aligned with and opposed to the cam 85 on the countershaft 56 (Fig. 7) is a cam 92 which operates to actuate the lever 93 mounted upon a rock-shaft 94 and which is connected between its ends with one end of a link 95. The latter is connected at its other end with the punch-press clutch control lever 96 mounted upon the counter-shaft 58 in a conventional manner to effect rotation of said shaft 58 through a single revolution following each actuation of said lever 96 by said cam 92.

This actuation of the shaft 58 effects a rotation of the spur-gear wheels 57 and spur-gear pinion 59. The latter effects a partial revolution of the spur-gear wheel 60 and causes the pinion 62 to drive the drums A and B through the arc necessary to move the pins 9 of the several carriers thereof from one station to the next.

For purposes of simplification the shaft 58 will be referred to hereinafter as the indexing shaft and the punch-press clutch associated with said shaft will be referred to as the indexing clutch.

The spur-gear wheel 54 actuates the spur-gear wheel 55 which is loosely mounted upon the shaft 56. Wheels 54 and 56 actuate the wire feed rolls 45 and 46 in an obvious manner (see Fig. 3). Wheel 56 also actuates wheel 57 rigid with the shaft 58 upon which the spur-gear pinion 59 is loosely mounted, the same being engaged for rotation by said shaft 58 by means of the punch-press clutch controlled by the lever 96.

Rigid with the rock-shaft 94 (Figs. 1 and 4) is a foot-lever 97 which may be operated independently of the foot lever 78 to cause the drums A and B to be rotated while the remainder of the mechanisms except those directly associated with the indexing shaft 58 remain idle, it being obvious that so long as the punch-press clutch of the shaft 53 is not tripped, the rotation of the feed rolls 45 and 46 will be ineffective to feed tie-wire and that the cut-off mechanism will also remain idle.

The cams 72 and 72a hold the clutch member 70, spur-wheel 73 and cams 85 and 92 against rotation in cooperation with the levers 80 and 80a and the recesses 83 and 83a.

If lever 78 is depressed and lever 97 remains idle, the punch-press clutch control lever 96 will be operated by the cam 92 as above described.

Operation

While the operation of the machine is probably clearly comprehensible from the foregoing specification, a brief review thereof follows:

Reference is had first to Fig. 14 wherein the uppermost rows of pins 9 of the drums A and B are shown to be loaded with upholstery springs and the next forward two rows thereof, also loaded, are disposed in the position wherein the drums A and B are at rest while the helical tie-wires are being formed and are advanced into encircling relation to the rows of springs mounted on said last-named pins 9.

As the drums B rotate in unison in respectively opposite directions due to the intermeshing spur-gear wheels 63 and 64, the devices 10 of the drum B become opposed to the rows of pins last referred to and engaged with the outer ends of the springs carried by said last-named pins. The spaces between opposed devices 8 and 10, respectively, is slightly less than the length of the springs and thus the latter become slightly compressed and, hence, more firmly engaged with the said devices 8 and 10 and in properly overlapped relation for encirclement by the tie wires by virtue of their engagement with the stops 40.

As soon as the tie-wires of length determined by the rotation of the wire feed rolls 45 and 46 during the period of their engagement of the tie-wires as determined by the arcuate surface portions of the cams 72 and 72a and fixed by the length of the recesses 83 of said cams, has been fed through the guide channels 11, the cut-off devices are operated and further feed stops automatically at substantially this instant due to completion of a single rotation of the shafts 53 and 56 and the reentry of the rollers 84 and 84b into the recesses 83 and 83b.

During this operation, the arms 42 are positioned as in Fig. 14 with the guide shoes of said arms disposed in engaging relation to the tie-wires.

As the assembling of rows of springs begins, the first operation consists in loading the uppermost pins 9 of drum A with springs in order of succession from right to left. As soon as the right hand row of these two rows has been loaded with springs, the operator depresses the lever 97 and causes the drums A and B to rotate without effecting actuation of any of the several cams above described. Then after loading the left-hand one of the two rows of springs, the operator again depresses the lever 97 thus bringing the two rows of springs into the overlapped relation above described and then loads the next row of pins 9 with springs.

The operator then depresses the lever 78 thereby causing the shafts 53 and 56 to rotate through a complete revolution in unison and in respectively opposite directions.

At the instant of depression of the foot lever 78, the several cams, devices actuated thereby, are positioned as best shown in Figs. 4, 5, 7 and 8, the rollers 45 and 46 being disengaged from the tie-wires, the projection 86 of the cam 85 disposed past the roller 90 on the lever 87, the projection of cam 92 disposed past the roller of lever 93, and the arms 42 disposed in the position of Fig. 17 due to the fact that the projections of cams 91 and 91a are engaged with the rollers at the lower ends of said arms as in Fig. 4.

At substantially the instant that the shafts 53 and 56 begin to rotate, the projections of the cams 91 and 91a move out of engagement with the rollers of the arms 43a, the latter springing apart responsively to the pressure of the spring 42a engaged with the arms 42 which are rigid with the arms 43a; and at about the same instant the tie-wire feed rolls begin operating as aforesaid.

The cams 85, 91 and 91a and 92 rotate while the tie-wires are formed and fed as aforesaid and at substantially the instant that this feeding stops as determined by the arcuate length of the recesses 83 and 83a of cams 72 and 72a the cam 85 actuates the cut-off devices, the cam 92 trips the punch-press clutch of the indexing shaft and the cam 91 and 91a restore the arms 42 and 43a to the position of Fig. 4.

The drums A and B then rotate to the next station and upon again depressing the lever 78 the foregoing operations are repeated.

After the predetermined number of rows of springs have been assembled by tie-wires as above described, the operator again depresses the lever 97 once or twice to clear the machine and then begins the assembling operations as indicated above.

I claim as my invention:

1. A spring construction assembling machine including a traveling carrier for rows of springs, an opposed traveling member adapted for cooperation with the first-named member for effecting partial compression of the springs at a predetermined point in the simultaneous travel of both said members, mechanism for imparting intermittent motion to both said members, in unison, cooperating means on said members for bringing the rows of springs successively into overlapping relation at a predetermined point in the travel of said members at which said springs are under compression, and mechanism for automatically feeding helical tie wires into encircling relation to said overlapped spring portions while said members are at rest.

2. In a machine of the type specified, a pair of opposed rotatable members operable in unison, rows of spring carriers disposed upon one of said members, devices on the other member adapted to become directly opposed to said carriers and spaced from the latter a distance less than the length of the springs mounted thereon as said carriers attain a predetermined point in their simultaneous movement, mechanism operatively associated with said carriers and said devices for automatically causing springs of two adjacent rows mounted upon said carrier and engaged with the companion member to become partially overlapped as said carriers attain said last-named position, mechanism for effecting movement of said members intermittently, and mechanism for automatically feeding helical tie wires into encircling relation to said overlapped spring portions while said members are at rest.

3. A machine of the type specified including an endless traveling carrier equipped with spring engaging devices, a movable member associated with said carrier and equipped with spring engaging devices, mechanism for imparting intermittent motion simultaneously to said carrier and said member to cause spring engaging devices of both thereof to become opposed to each other at a predetermined point in the travel of said carrier, mechanism associated with the spring engaging devices of said carrier and member for automatically positioning springs engaged with said devices in overlapping relation to each other as said carrier attains said point in its travel, and automatically actuated mechanism operatively associated with said devices for encircling the overlapped spring portions with helical tie wires while said carrier and member remain at rest.

4. A machine of the type specified including a traveling carrier equipped with spaced apart parallel rows of spring engaging devices, indexing mechanism for advancing said carrier intermittently a distance equal to the spacing apart of two rows of said devices, mechanism associated with said carrier for automatically causing two rows of said devices to approach each other to bring the rows of spring engaged with the latter into predetermined relative positions as said carrier attains successively a predetermined point in its travel, mechanism operatively associated with said indexing mechanism for coupling adjacent portions of springs of the two rows last mentioned while said carrier remains in said last-mentioned position, said mechanism for causing said rows of devices to approach each other operating also to cause said last-named devices to release the springs engaged therewith during further travel of said carrier.

5. A machine of the type specified including a traveling carrier equipped with spaced apart rows of spring engaging devices disposed transversely of the direction of travel of said carrier, indexing mechanism for effecting intermittent travel of said carrier a distance equal to the spacing apart of said rows of devices, the latter being movable relatively to the carrier, cooperating means associated with the carrier and each row of said devices to cause two contiguous rows of the latter to become relatively positioned at one point in the travel of said carrier to bring the terminal coils of the two rows of springs into relative position to be coupled, automatic spring coupling mechanism associated with said indexing mechanism for effecting the coupling of said last-named rows of spring while the carrier is at rest, and a single actuating means common to said indexing and coupling mechanisms.

6. A machine of the type specified including a traveling carrier equipped with parallel spaced apart rows of spring engaging devices disposed transversely of the direction of travel of the carrier and movable relatively to the latter and to each other, guide devices for the reception of helical tie wires alternated with said rows of first-named devices, means on said guide devices adapted for cooperation with the first-named devices to position successive rows of springs engaged therewith relatively to said devices for coupling each row of springs with the next succeeding row thereof at a given point in the travel of the carrier, mechanism associated with the carrier for advancing tie wires through said guide devices into encircling relation to parts of the springs of both rows disposed at said point to couple the same, automatic mechanism for imparting intermittent movement to the carrier, mechanism operatively associated with the carrier and said spring engaging devices to effect movements of the latter relatively to the carrier and each other to cause successive rows of springs to engage said means during periods of rest of said carrier and effect release of the springs from said first-named devices following coupling of said springs, and means common to both said mechanisms for actuating the same successively.

7. A machine of the type specified including a pair of rotatable members disposed in opposed relation to each other, spring carrying devices mounted upon one of said members, spring engaging devices mounted upon the other thereof, said devices of each of said members being equal in number and disposed in parallel spaced apart rows extending parallel with their axes, mechanism for imparting intermittent movement simultaneously and in respectively opposite directions to both said members thereby to cause the devices of both thereof to engage respectively opposite ends of the springs at a predetermined point in the rotation of said members, mechanism associated with said members and devices for automatically effecting encircling of terminal coils of springs of contiguous rows engaged with the devices of both members by helical tie-wires for coupling said springs while said members are at rest, said last-named mechanism including guide devices for said tie-wires rigid with said members and cooperating guide devices operative to be positioned for such cooperation while said tie-wires are encircling said springs, and mechanism associated with both the aforesaid mechanisms for actuating the same and said cooperating guide devices in a predetermined order of succession.

8. A machine of the type specified including a pair of opposed traveling members each equipped with parallel rows of spring engaging devices extending transversely of the direction of travel of said carriers and spaced from each other with said devices of said respective members adapted to engage opposite ends of springs at predetermined points in the travel of said carriers, indexing mechanisms for imparting intermittent simultaneous travel to said members the devices of one of said members adapted to carry rows of springs, normally relatively positioned out of coupling position relatively to each other, means associated with the devices of said members to move pairs of the same relatively to said members during a portion of each movement of the latter for positioning the springs of said pairs into coupling relation to each other and in partiallly compressed state between corresponding sets of said devices of both carriers, means on the carriers cooperating with said devices for effecting the last-mentioned positioning of said springs, mechanism for effecting coupling of the respective rows of springs disposed in said last-named positioning while said members are at rest, the latter including automatic devices associated with the means on the members and with the spring coupling mechanism for guiding the coupling means into effective engagement with the springs.

9. A machine of the type specified including a pair of opposed traveling members, indexing mechanism for effecting simultaneous equal intermittent movement of both said members, parallel rows of spring engaging devices mounted upon each of said members, said devices of one member equipped with means adapted to engage within the springs for maintaining the same engaged with said member, cams associated with the said devices of both members for moving the same relatively to said members during a predetermined period of travel thereof at each actuation of said members thereby to cause companion rows of devices of both members to become engaged with opposite ends of the springs of two contiguous rows of springs and partially compress the same as said members attain the end of each movement, means on said members for cooperation with said first-named means and said cams for engaging the terminal coils of said companion rows of springs and position the same for engagement with coupling devices, spring coupling mechanism operatively associated with said indexing mechanism for coupling said last-named rows of springs during periods of rest of said members, and mechanism also operatively associated with the several preceding mechanisms for guiding the coupling means during operation of the coupling mechanism.

10. A machine of the type specified including a rotatable drum equipped with a series of equally spaced helical tie-wire guide devices parallel with the drum axis, a series of spring carrier bars mounted on said drum in staggered relation to said guide devices and movable relatively to the latter, a row of spring engaging devices mounted upon each of said bars, a helical tie-wire feed mechanism disposed to pass tie wires successively along said guide devices as said drum attains a predetermined point in its movement, indexing mechanism for effecting intermittent movement of said drum to position said guide-devices successively into alignment with said feed mechanism, a cam, and means connected with said carrier bars and engaged with said cam for position-successive pairs of rows of said springs relatively to said guide devices for engagement with said tie-wires to effect coupling of the said rows of springs.

11. A machine of the type specified including a rotatable drum equipped with a series of equally spaced helical tie-wire guide devices parallel with the drum axis, a series of spring carrier bars mounted on said drum in staggered relation to said guide devices and movable relatively to the latter, a row of spring engaging devices mounted upon each of said bars, a helical tie-wire feed mechanism disposed to pass tie-wires successively along said guide devices as said drum attains a predetermined point in its movement, indexing mechanism for effecting intermittent movement of said drum to position said guide-devices successively into alignment with said feed mechanism, a cam, spring engaging elements on said guide devices, and devices connected with said carrier bars and engaged with said cam for moving two contiguous rows of springs into engagement with said elements and thereby positioning predetermined parts of said springs into the path of the tie-wire during each period of rest of said drum.

12. A machine of the type specified including a pair of parallel opposed rotatable drums, indexing mechanism for rotating the same intermittently and simultaneously in respectively opposite directions, guide bars for helical tie-wires mounted in equally spaced apart parallel relation upon said drums, a helical tie-wire feeding mechanism disposed at a point in the rotation of said drums wherein said guide bars are aligned therewith successively during periods of rest of said drums, carriers for rows of springs mounted upon one of said drums in staggered relation to said guide bars and movable relatively to the latter and each other, rows of cooperating spring engaging devices on the other drum similarly disposed and movable relatively to each other and to the guide bars thereof, rigid cams operatively associated with said carriers and devices of the respective drums for bringing two rows of springs into substantially axially parallel relation to each other and with their outer ends engaged with the devices of the last-named drum as said drums attain successive points of rest, thereby to bring predetermined portions of the springs of two rows thereof into the path of the tie wire fed along said guide bars for coupling the said springs of the two rows with each other at both ends.

13. A machine of the type specified including a pair of parallel opposed rotatable drums, indexing mechanism for rotating the same intermittently and simultaneously in respectively opposite directions, guide bars for helical tie wires mounted in equally spaced apart parallel relation upon said drums, a helical tie-wire feeding mechanism disposed at a point in the rotation of said drums wherein said guide bars are aligned therewith successively during periods of rest of said drums, carriers for rows of springs mounted upon one of said drums in staggered relation to said guide bars and movable relatively to the latter and each other, rows of cooperating spring engaging devices on the other drum similarly disposed and movable, relatively to each other and to the guide bars thereof, rigid cams operatively associated with said carriers and devices of the respective drums for bringing two rows of springs into substantially axially parallel relation to each other and with their outer ends engaged with the devices of the last-named drum as said drums attain successive points of rest, thereby to bring predetermined portions of the springs of two rows thereof into the path of the tie wire fed along said guide bars for coupling the said springs of the two rows with each other at both ends, and mechanism and devices associated with said guide bars for cooperation with said carriers and devices of said drums for positioning the springs as aforesaid and further guiding the tie wires.

14. A machine of the type specified including a pair of parallel opposed rotatable drums equipped with cooperating pairs of devices for engaging respectively opposite ends of springs carried by one of said drums at predetermined points in the rotation of said drums, indexing mechanism for rotating said drums intermittently in unison in respectively opposite directions, a tie-wire feed mechanism associated with said drums, tie wire guide means associated with said drums and adapted to become aligned with said feed means at the end of each movement of said drums, devices associated with said guide means for positioning predetermined portions of springs of pairs of the latter in predetermined relation to said guide means in the path of the tie-wires as said drums attain positions of rest, the duration of the periods of rest being controlled by the operator.

15. A machine of the type specified including a pair of parallel opposed rotatable drums equipped with cooperating pairs of devices for engaging respectively opposite ends of springs carried by one of said drums at predetermined points in the rotation of said drums, indexing mechanism for rotating said drums intermittently in unison in respectively opposite directions, a tie-wire feed mechanism associated with said drums, tie-wire guide means associated with said drums and adapted to become aligned with said feed means at the end of each movement of said drums, devices associated with said guide means for positioning predetermined portions of springs of pairs of the latter in predetermined relation to said guide means in the path of the tie-wires as said drums attain position of rest, the duration of the periods of rest being controlled by the operator, and cams associated with said first-named spring engaging devices of said drums for moving the latter relatively to each other and said guide means to position contiguous springs axially substantially parallel with each other as said drums approach and attain each period of rest.

16. A machine of the type specified including a pair of parallel opposed rotatable drums, a constantly rotating drive shaft, an indexing mechanism for effecting intermittent rotation of said drums in unison in respectively opposite directions, a manually controlled clutch associated with said indexing mechanism for associating and disassociating the same with and from said drive shaft, guide means for helical tie wires mounted upon the respective tie wires, mechanism for feeding tie wires through said guide means at the end of each indexed movement of said drums, a second manually controlled clutch controlling the operation of said feed means, a series of devices for engaging opposite ends of springs disposed in parallel rows upon one of said drums mounted upon the respective drums in staggered relation to the guide means thereof, cams associated with said spring engaging devices for automatically positioning pairs of rows of springs engaged thereby into predetermined relation to said guide means and the path of said tie wires for effecting coupling thereof, responsively to rotation of said drums, during each period of rest of the latter.

17. A machine of the type specified including a pair of parallel opposed rotatable drums, a constantly rotating drive shaft, an indexing mechanism for effecting intermittent rotation of said drums in unison in respectively opposite directions, a manually controlled clutch associated with said indexing mechanism for associating and disassociating the same with and from said drive shaft, guide means for helical tie wires mounted upon the respective tie wires, mechanism for feeding tie wires through said guide means at the end of each indexed movement of said drums, a second manually controlled clutch controlling the operation of said feed means, a series of devices for engaging opposite ends of springs disposed in parallel rows upon one of said drums mounted upon the respective drums in staggered relation to the guide means thereof, cams associated with said spring engaging devices for automatically positioning pairs of rows of springs engaged thereby into predetermined relation to said guide means and the path of said tie wires for effecting coupling thereof, responsively to rotation of said drums, during each period of rest of the latter, and mechanism associating the first-named clutch with the second-named clutch for automatic control of the former by the latter, said second-named clutch controlling the operation of said feed means.

18. A machine of the type specified including a rotatable drum equipped with a series of equally spaced apart guide bars peripherally thereof, indexing mechanism for rotating the drum intermittently through an arc equal to the spacing apart of said bars, a tie-wire feed mechanism disposed for alignment successively with said bars at one point in the rotation of the drum, stops on the guide bars, a series of spring carrying members disposed in staggered relation to said bars and pivotally mounted on said drum, a row of spaced apart spring engaging devices mounted on each of said members, a crank-arm at one end of each of said members, a rigid cam engaging said crank-arms for causing pivotal movements thereof relatively to the drum and to each other responsively to rotation of said drum and operating to cause two adjacent rows of springs to be engaged with said stops on said guide bars and thereby positioned for encirclement of predetermined portions of said springs by a tie wire as the said bar is aligned with said feed mechanism, a guide mechanism associated with said drum for cooperation with the successive guide bars and spring carriers to guide the tie-wire, and a single drive gear common to all of said mechanisms for actuating the same in a predetermined order of succession.

19. In a machine of the type specified, the combination with an intermittently movable carrier for a plurality of spaced apart rows of springs to be coupled, a spring coupling mechanism associated with said carrier and operative during intervals of rest of the carrier at a predetermined point in the travel thereof, associated mechanisms for rotating said drum at predetermined intervals and actuating said coupling mechanism, of cooperating means on the drum and the machine operating responsively to rotation of the drum for successively positioning the springs of two adjacent rows relatively to said coupling mechanism immediately preceding operation of the latter while the carrier is at rest, and a single drive mechanism common to said carrier and said coupling mechanism for actuating the same in predetermined order of succession.

20. In a machine of the type specified, the combination with an intermittently movable carrier for a plurality of spaced apart rows of springs to be coupled, a spring coupling mechanism associated with said carrier and operative during intervals of rest of the carrier at a predetermined point in the travel thereof, associated mechanisms for rotating said drum at predetermined intervals and actuating said coupling mechanism, of cooperating means on the drum and the machine operating responsively to rotation of the drum for successively positioning the springs of two adjacent rows relatively to said coupling mechanism immediately preceding operation of the latter while the carrier is at rest, and a single manually controlled drive mechanism common to said carrier and said coupling mechanism for actuating the same in predetermined order of succession.

21. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, cams rigid with the frame of the machine, crank-arms on said bars of both disks engaged with the respective cams for imparting pivotal movements to said bars at predetermined points in the rotation of the pairs of disks, mechanism for imparting intermittent motion to said disks through an arc equal to the spacing apart of the pivots of said bars, said cams co-operating with said arms to cause two rows of springs engaged with carriers and said means to be positioned to be coupled with each other.

22. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, cams rigid with the frame of the machine, crank-arms on said bars of both disks engaged with the respective cams for imparting pivotal movements to said bars at predetermined points in the rotation of the pairs of disks, mechanism for imparting inter-mittent motion to said disks through an arc equal to the spacing apart of the pivots of said bars, said cams co-operating with said arms to cause two rows of springs engaged with carriers and said means to be positioned to be coupled with each other and mechanism for rotating and advancing helical tie-wire into coupling relation to said rows of springs between movements of said shafts.

23. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, cams rigid with the frame of the machine, crank-arms on said bars of both disks engaged with the respective cams for imparting pivotal movements to said bars at predetermined points in the rotation of the pairs of disks, mechanism for imparting intermittent motion to said disks through an arc equal to the spacing apart of the pivots of said bars, said cams co-operating with said arms to cause two rows of springs engaged with carriers and said means to be positioned to be coupled with each other, guides for helical tie-wires rigidly mounted upon said disks in staggered relation to said bars, companion guide means for retaining the tie-wire in said guides, and mechanism for rotating and advancing helical tie-wires along said guides into coupling relation to said rows of springs.

24. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, cams rigid with the frame of the machine, crank-arms on said bars of both disks engaged with the respective cams for imparting pivotal movements to said bars at predetermined points in the rotation of the pairs of disks.

mechanism for imparting inter-mittent motion to said disks through an arc equal to the spacing apart of the pivots of said bars, said cams cooperating with said arms to cause two rows of springs engaged with carriers and said means to be positioned to be coupled with each other, guides for helical tie wires rigidly mounted upon said disks in staggered relation to said bars, companion guide means for retaining the tie wire in said guides, mechanism for rotating and advancing helical tie wires along said guides into coupling relation to said rows of springs and mechanism for moving said guide means toward and from said guides while said shafts are rotating.

25. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, for causing said springs to be partially compressed at a predetermined point in the rotation of said disks, guides for helical tie-wires rigidly mounted upon said disks in staggered relation to said bars, companion guide means for retaining the tie-wire in said guides, and mechanism for rotating and advancing helical tie-wires along said guides into coupling relation to said rows of springs.

26. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, for causing said springs to be partially compressed at a predetermined point in the rotation of said disks, guides for helical tie-wires rigidly mounted upon said disks in staggered relation to said bars, companion guide means for retaining the tie-wire in said guides, and mechanism for rotating and advancing helical tie-wire along said guides into coupling relation to said rows of springs, and mechanism for rotating and advancing a helical tie-wire into coupling relation to said rows of springs between movements of said shafts.

27. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, for causing said springs to be partially compressed at a predetermined point in the rotation of said disks, guides for helical tie wires rigidly mounted upon said disks in staggered relation to said bars, companion guide means for retaining the tie wire in said guides, and mechanism for rotating and advancing helical tie wires along said guides into coupling relation to said rows of springs, guides for helical tie wires rigidly mounted upon said disks in staggered relation to said bars, companion guide means for retaining the tie wire in said guides and mechanism for rotating and advancing helical tie wires along said guides into coupling relation to said rows of springs.

28. In a machine of the type specified, a pair of parallel shafts geared to rotate in unison in opposite directions and each equipped with a pair of spaced apart disks, a series of equally spaced apart rocking bars pivotally engaged at their ends in the respective pairs of disks and arranged so that the bars of one pair of disks become opposed to the bars of the other at a point in the rotation of said disks, spring carriers mounted upon the bars of one pair of disks, means on the bars of the other disks for engaging the other ends of the springs carried by the first-named bars as the respective bars approach opposed relation, for causing said springs to be partially compressed at a predetermined point in the rotation of said disks, guides for helical tie wires rigidly mounted upon said disks in staggered relation to said bars, companion guide means for retaining the tie wire in said guides, and mechanism for rotating and advancing helical tie wire along said guides into coupling relation to said rows of springs, and mechanism for rotating and advancing a helical tie wire into coupling relation to said rows of springs between movements of said shafts, guides for helical tie wires rigidly mounted upon said disks in staggered relation to said bars, companion guide means for retaining the tie wire in said guides, and mechanism for rotating and advancing helical tie wires along said guides into coupling relation to said rows of springs.

29. In a machine of the type specified, a pair of opposed traveling members operable in unison, a series of spaced apart spring carriers arranged in parallel rows mounted upon each of said members and arranged so that a row of carriers of one member becomes opposed to that of a carrier of the other member at a predetermined point in the movements of both said members, said respective carriers equipped with spring supporting and guiding devices respectively, cooperating to dispose adjacent rows of springs engaged therewith in position wherein the terminal coils of said springs of said respective rows are disposed to be coupled by helical tie wires each extending throughout the length of said rows, mechanism for actuating said member intermittently to move the same a distance substantially equal to the diameter of the terminal coils of said springs, and means for rotating and advancing helical tie wires into coupling relation to the springs as they attain the last-mentioned position.

30. In a machine of the type specified, a pair of opposed traveling members operable in unison, a series of spaced apart spring carriers arranged in parallel rows mounted upon each of said members and arranged so that a row of carriers of one member becomes opposed to that of a carrier of the other member at a predetermined point in the movements of both said members, said respective carriers equipped with spring supporting and guiding devices and with helical tie wire guide means, respectively, cooperating to dispose adjacent rows of springs engaged therewith in position wherein portions of the terminal coils of both rows of said springs are positioned over the tie-wire guide means, mechanism for rotating and advancing helical tie wires through said guide means into encircling relation to said spring portions while said members are at rest, and mechanism for imparting intermittent movement to said members and carriers for advancing the latter successively a distance substantially equal to the diameter of the terminal coils of said springs.

31. A machine of the type specified including a pair of parallel opposed movable members, spring carrier devices operatively associated with said members and equipped with rows of spring engaging and positioning devices, and with means for guiding helical tie wires in the direction of the axes of said members, mechanism for moving said members intermittently and simultaneously in respectively opposite directions to cause carrier devices associated with one thereof to become opposed to carrier devices of the other thereof at a predetermined point in the movement of said members wherein a row of springs disposed between said opposed carriers have portions of their terminal coils disposed over a tie wire guiding means in close proximity to similar portions of terminal coils of springs of another row thereof disposed between the next succeeding carriers, mechanism for moving said members intermittently, and means for rotating and advancing helical tie wires through said guide means into coupling relation to said two rows of springs.

32. A machine of the type specified including two members arranged for simultaneous equal travel and equipped with rows of carriers for springs for shifting the same from a primary to successively advanced positions while engaged with said carriers, mechanism for rotating and advancing helical tie wires into coupling relation to a pair of contiguous rows of springs engaged with said carriers at a predetermined point in the movements of said carriers, power actuated means for imparting intermittent movement to said members and carriers of predetermined equal degree and thereby automatically positioning succeeding rows of springs in relation to preceding rows thereof with respect to said tie wire feeding mechanism to be coupled by tie wires fed from the latter and subsequently effecting successive disengagement of the coupled rows of springs from the machine, and means associated with said carriers for guiding said tie wires into the aforesaid coupling relation to said contiguous rows of springs.

33. A machine of the type specified comprising a pair of parallel opposed traveling members, a means for engaging successive rows of springs in a primary position for travel with said members to successively advanced position, means operatively associated with said carriers for bringing predetermined portions of the terminal coils of one row of springs into predetermined positions with respect to similar portions of terminal coils of a next preceding row of springs at a predetermined point in the travel of said members, power actuated means for imparting equal intermittent movement to said members, and mechanism for rotating helical tie wires to be engaged with the aforesaid coil portions to be coupled thereby, and guide means for said tie wires, the latter being automatically advanced during rotation by engagement with said coil portions.

34. In a machine of the type specified, a pair of axially parallel spaced apart intermittently movable members each equipped with spaced apart devices for engaging the terminal coils of rows of springs for moving the latter successively to advanced positions, helical tie wire guide grooves associated with said devices and positioned so that portions of terminal coils of the springs of two rows will be disposed in contiguous relation in the path of helical tie wires at a predetermined point in the movement of said members, a helical tie wire rotating and advancing means disposed at one end of said last-named point for advancing a tie wire through the tie wire guide then aligned with said means, and power actuated mechanism for actuating said members and said means.

35. A machine of the type specified comprising a pair of parallel opposed traveling members, a means for engaging successive rows of springs in a primary position for travel with said members to successively advanced position, means operatively associated with said carriers for bringing predetermined portions of the terminal coils of one row of springs into predetermined positions with respect to similar portions of terminal coils of a next preceding row of springs at a predetermined point in the travel of said members, power actuated means for imparting equal intermittent movement to said members, and mechanism for rotating helical tie wires to be engaged with the aforesaid coil portions to be coupled thereby, and guide means for said tie wires, said carriers being movable relative to said members, said carriers and the machine frame equipped with cooperating means for effecting movements to selected carriers during movements of said members for bringing two contiguous rows of springs into position to be coupled by said tie wire rotating mechanism.

36. A machine of the type specified comprising a pair of parallel opposed traveling members, a means for engaging successive rows of springs in a primary position for travel with said members to successively advanced position, means operatively associated with said carriers for bringing predetermined portions of the terminal coils of one row of springs into predetermined positions with respect to similar portions of terminal coils of a next preceding row of springs at a predetermined point in the travel of said members, power actuated means for imparting equal intermittent movement to said members, and mechanism for rotating helical tie wires to be engaged with the aforesaid coil portions to be coupled thereby, and guide means for said tie wires, said carriers being pivotally associated with said members and equipped with arms, and the machine frame being equipped with a cam engaged with said arms for imparting pivotal movement to said arms successively as the latter approach the position wherein terminal coil portions of two rows of springs attain coupling position.

FRED R. ZIMMERMAN.